United States Patent [19]
Correa et al.

[11] Patent Number: 5,449,989
[45] Date of Patent: Sep. 12, 1995

[54] ENERGY CONVERSION SYSTEM

[76] Inventors: Paulo N. Correa; Alexandra N. Correa, both of 42 Rockview Gardens, Concord, Ontario, Canada, L4K 2J6

[21] Appl. No.: 54,111

[22] Filed: Apr. 15, 1993

Related U.S. Application Data

[63] Continuation-in-part of Ser. No. 922,863, Jul. 31, 1992, abandoned, and Ser. No. 961,531, Oct. 15, 1992, Pat. No. 5,416,391.

[51] Int. Cl.$^6$ .............................................. H03K 3/37
[52] U.S. Cl. ...................... 318/558; 313/581; 315/111.21; 315/111.31; 315/171; 315/173; 327/533; 327/601
[58] Field of Search ............... 318/558, 727; 313/306, 313/581; 315/84.51, 111.01, 111.21, 111.31, 160, 171, 173, 187, 188, 193, 200 R, 207; 328/59, 60, 61, 69, 70, 85, 208, 219, 220, 225, 249, 250, 251, 260, 264; 363/116, 117

[56] References Cited

U.S. PATENT DOCUMENTS

| | | |
|---|---|---|
| 3,205,162 | 9/1965 | MacLean . |
| 3,471,316 | 10/1969 | Manuel . |
| 3,705,329 | 12/1972 | Vogeli . |
| 3,801,202 | 4/1974 | Breaux . |
| 3,864,640 | 2/1975 | Bennett . |
| 3,878,429 | 4/1975 | Iwata . |
| 4,009,416 | 2/1977 | Lowther . |
| 4,128,788 | 12/1978 | Lowther . |
| 4,194,239 | 3/1980 | Jayaram et al. . |
| 4,443,739 | 4/1984 | Woldring . |
| 4,489,269 | 12/1984 | Edling et al. . |
| 4,527,044 | 7/1985 | Bruel et al. . |
| 4,772,816 | 9/1988 | Spence . |
| 4,896,076 | 1/1990 | Hunter et al. . |
| 5,126,638 | 6/1992 | Dethlefsen . |

OTHER PUBLICATIONS

Tanberg, R. "On the Cathode of an Arc Drawn in Vacuum", (1930), Phys. Rev., 35:1080.
Kobel, E. "Pressure & High Vapour Jets at the Cathodes of a Mercury Vacuum Arc", (1930), Phys. Rev., 36:1636.
Aspden, H. (1969) "The Law of Electrodynamics", J. Franklin Inst., 287:179.
Aspden, H. (1983) "Planar Boundaries of the Space--Time Lattice" Lettere Al Nuovo Cimento, vol. 38, No. 7, pp. 243–246.
Aspden, H. (1980) "Physics Unified", Sabberton Publications, pp. 14–17, 42–45, 88–89, 190–193.
Pappas, P. T. (1983) "The Original Ampere Force and Bio-Savart & Lorentz Forces", Il Nuovo Cimento, 76B:189.
Graham, G. M. & Lahoz, D. G. (1980) "Observation of Static Electromagnetic Angular Momentum in Vacuo", Nature, vol. 285, pp. 154 & 155.
Sethlan, J. D. et al., "Anomalous Electron–Ion Energy Transfer in a Relativistic–Electron–Beam–Plasma" Phys. Rev. Letters, vol. 40, No. 7, pp. 451–454 (1978).

Primary Examiner—Bentsu Ro

[57] ABSTRACT

An energy conversion device includes a discharge tube which is operated in a pulsed abnormal glow discharge regime in a double ported circuit. A direct current source connected to an input port provides electrical energy to initiate emission pulses, and a current sink in the form of an electrical energy storage or utilization device connected to the output port captures at least a substantial proportion of energy released by collapse of the emission pulses.

23 Claims, 13 Drawing Sheets

CHARGE PACK OPEN CIRCUIT VOLTAGE AT 15 MIN.
AFTER SUCCESIVE PAGD RUNS

PRESSURE IN TORR 5,449,989

ENERGY CONVERSION SYSTEM

REFERENCE TO RELATED APPLICATIONS

This application is a continuation-in-part of U.S. application Ser. No. 07/922,863, filed Jul. 31, 1992 (abandoned), and is also a continuation-in-part of U.S. patent application Ser. No. 07/961,531, filed Oct. 15, 1992, now U.S. Pat. No. 5,416,391.

BACKGROUND OF THE INVENTION

1. Field of the Invention

This invention relates to energy conversion circuits utilizing discharge tubes operating in the pulsed abnormal glow discharge (PAGD) regime.

2. Review of the Art

Such discharge tubes and circuits incorporating them are described in our copending U.S. patent application Ser. Nos. 07/922,863 and 07/961,531. The first of these applications discloses discharge tube constructions particularly suited for PAGD operation, and the second discloses certain practical applications of such tubes, particularly in electric motor control circuits. The review of the art contained in those applications is incorporated herein by reference, as is their disclosure and drawings.

It is known that there are anomalous cathode reaction forces associated with the cathodic emissions responsible for vacuum arc discharges, the origin and explanation of which have been the subject of extensive discussion in scientific literature, being related as it is to ongoing discussion of the relative merits of the laws of electrodynamics as variedly formulated by Ampere, Biot-Savart and Lorentz. Examples of literature on the subject are referenced later in this application.

SUMMARY OF THE INVENTION

The particular conditions which prevail in a discharge tube operated in the PAGD regime, in which a plasma eruption from the cathode is self-limiting and collapses before completion of a plasma channel to the anode gives rise to transient conditions which favour the exploitation of anomalous cathode reaction forces.

We have found that apparatus utilizing discharge tubes operated in a self-sustaining pulsed abnormal glow discharge regime, in a double ported circuit designed so that energy input to the tube utilized to initiate a glow discharge pulse is handled by an input circuit substantially separate from an output circuit receiving energy from the tube during collapse of a pulse, provides valuable energy conversion capabilities.

The invention extends to a method of energy conversion, comprising initiating plasma eruptions from the cathode of a discharge tube operating in a pulsed abnormal glow discharge regime utilizing electrical energy from a source in a first circuit connected to said discharge tube, and capturing electrical energy generated by the collapse of such eruptions in a second circuit connected to said discharge tube.

SHORT DESCRIPTION OF THE DRAWINGS

The invention is described further with reference to the accompanying drawings, in which.

Figure 14:
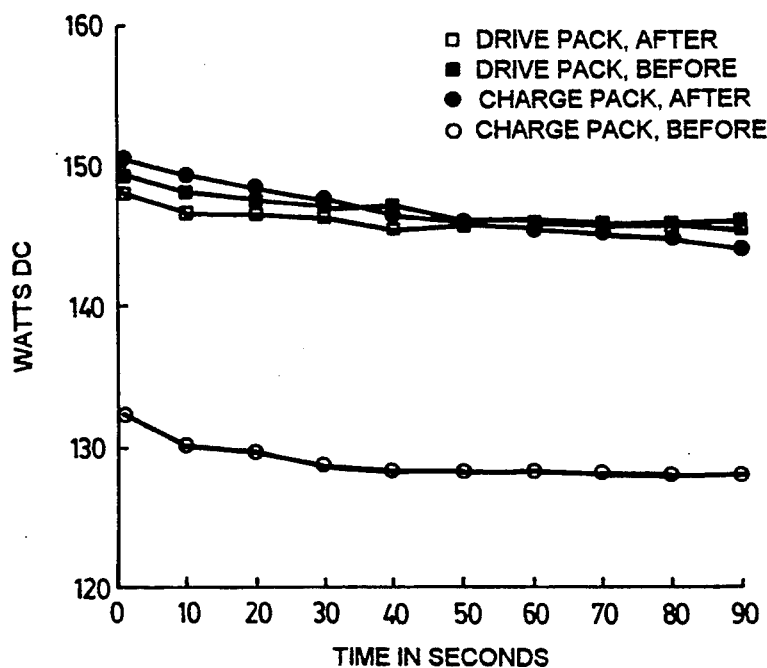

FIG. 14 shows an example of negligible actual power measurements taken immediately before or after a PAGD run, showing both the drive pack loss and the charge pack gain in DC Watts; DP resistance=2083 ohms; CP resistance=833 ohms.

Figure 15A:
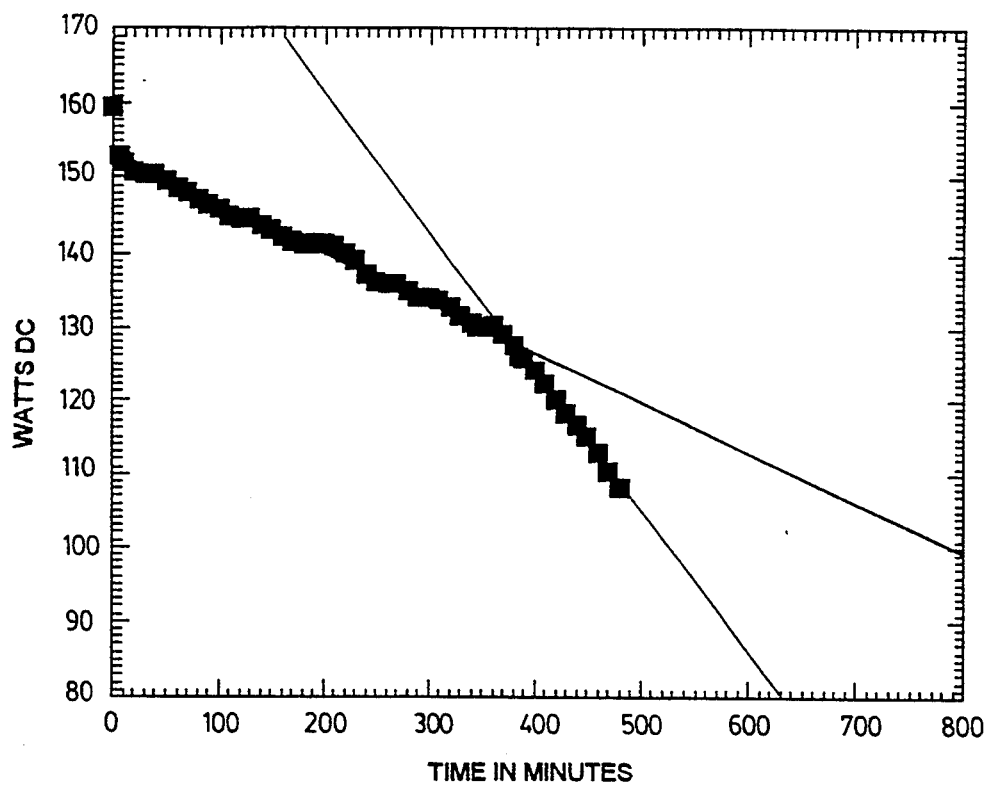
Figure 15B:
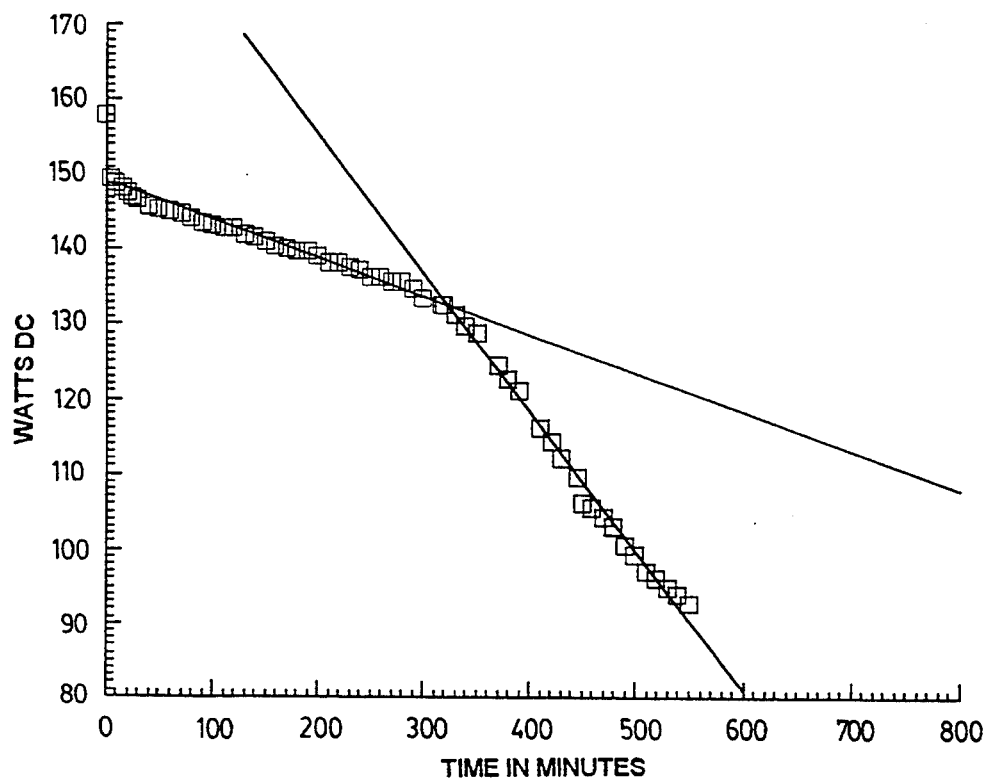

FIGS. 15A and 15B show resistive voltage discharge curves for two separate lead-zero gel-cell packs utilized respectively as the drive and the charge packs; load resistances employed were 2083 ohms across the drive pack (FIG. 15A) and 833 ohms across the charge pack (FIG. 15B).

Figure 16:
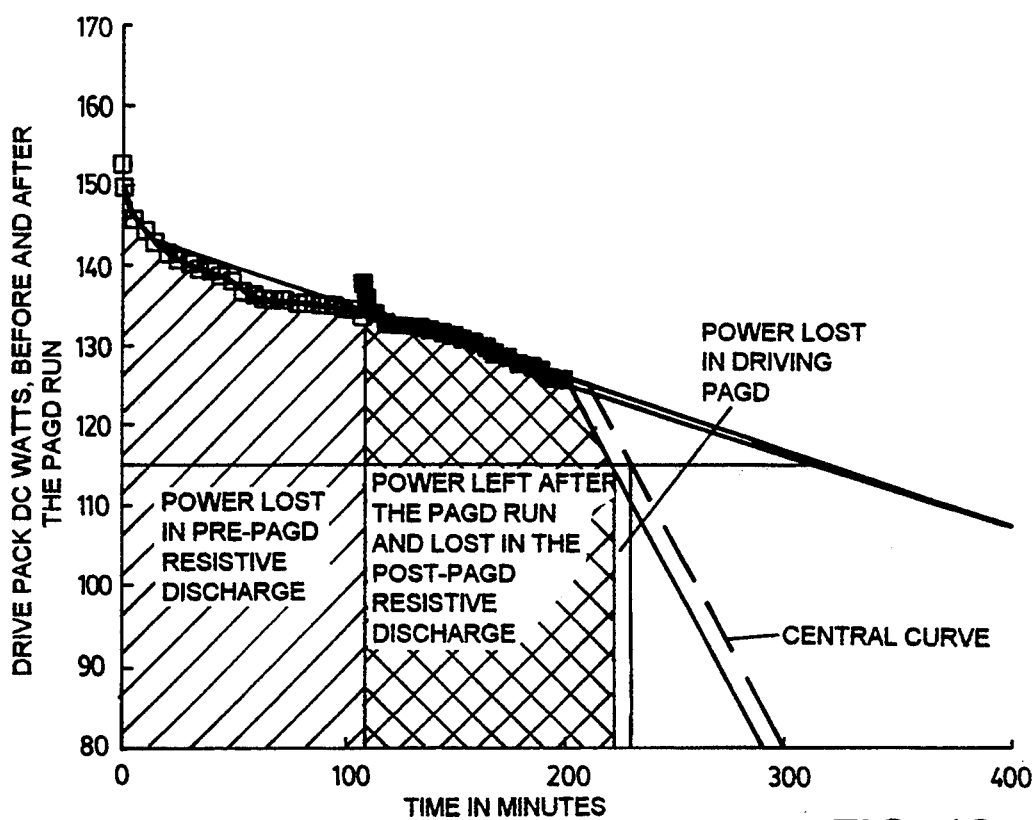

FIG. 16 shows resistive discharge slopes for a drive pack before and after a very small expenditure of power in providing energy input to a PAGD run; R=2083 ohms.

Figure 17:
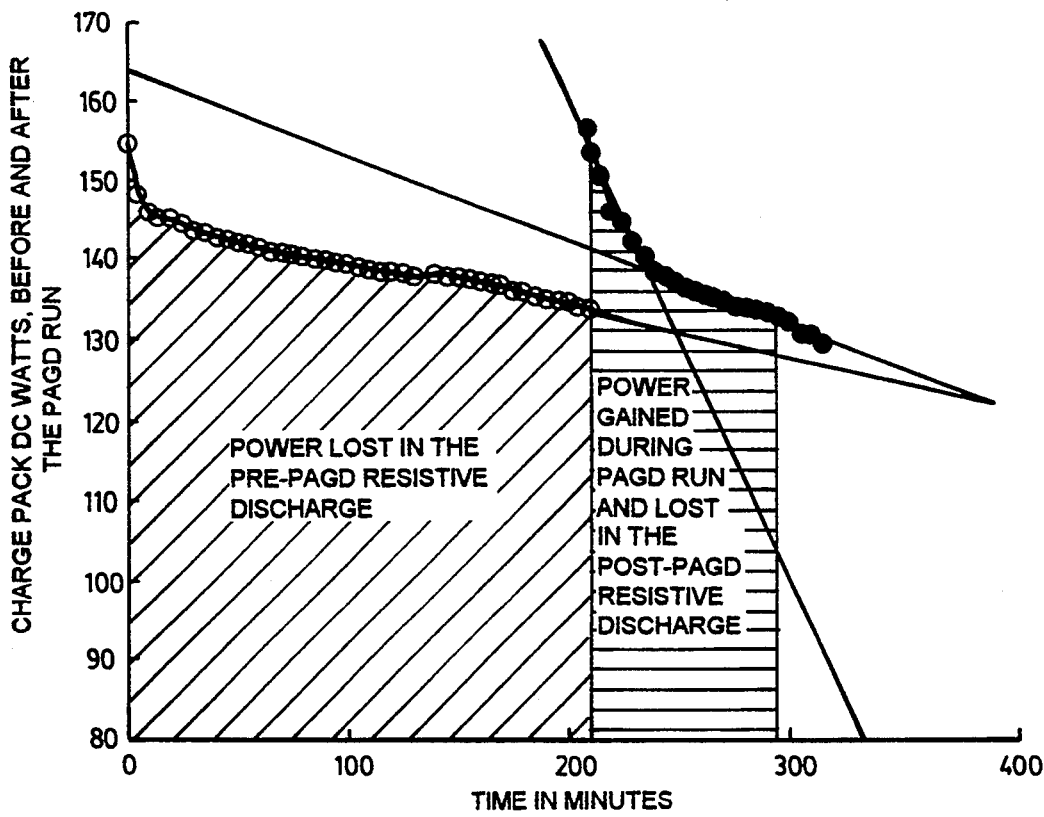

FIG. 17 shows resistive discharge slopes for a charge pack before and after capturing energy from the collapse of PAGD pulses in the same test as FIG. 15; R=833 ohms.

Figure 18:
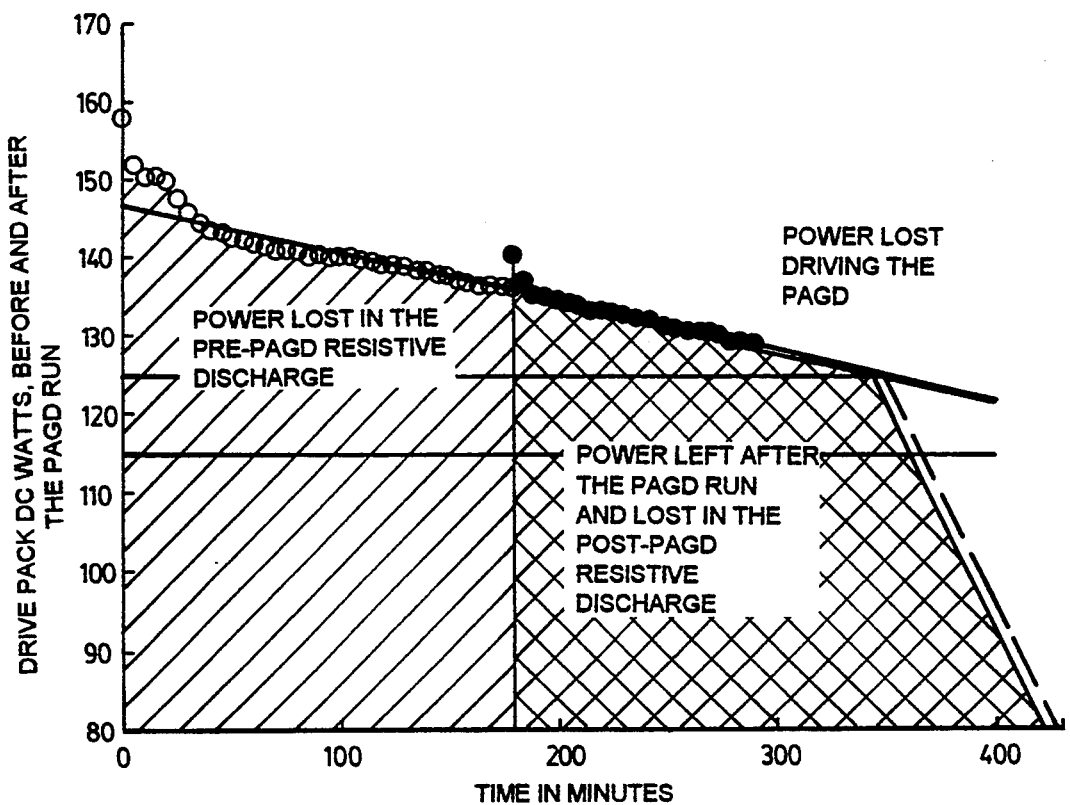

FIG. 18 shows resistive discharge slopes for a drive pack before and after a very small expenditure of power in providing energy input to a PAGD run in a further experiment; R=2083 ohms.

Figure 19:
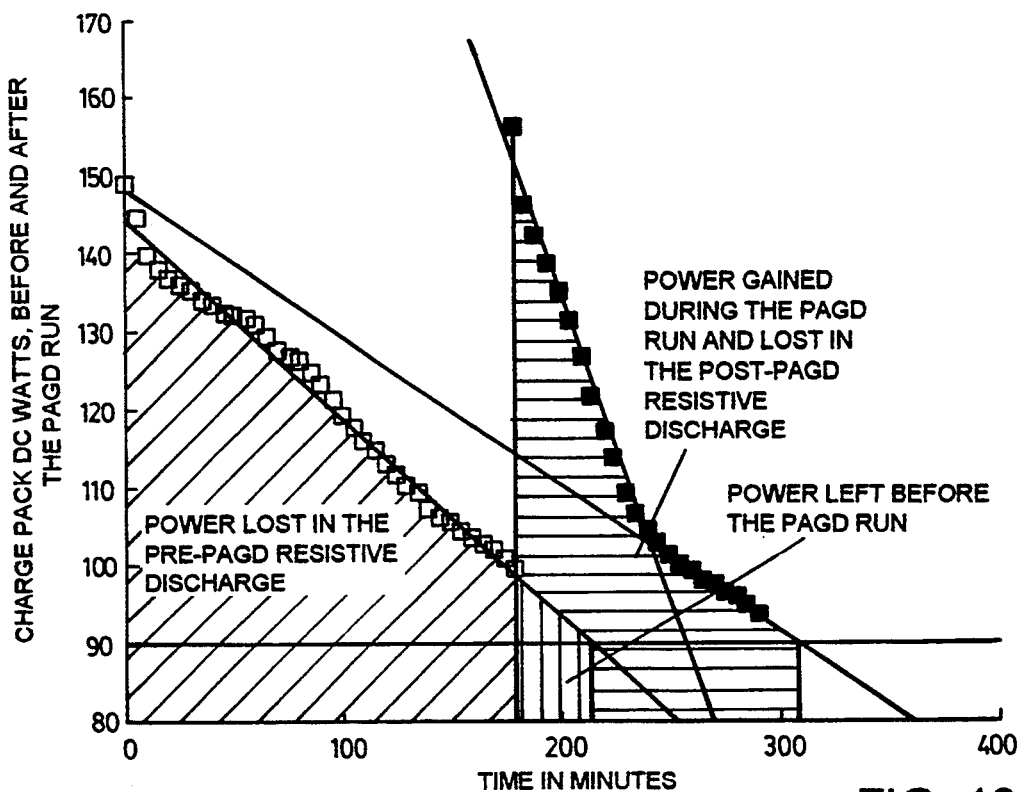

FIG. 19 shows resistive discharge slopes for a charge pack before and after capturing energy from the PAGD run of FIG. 18; R=833 ohms.

Figure 20:
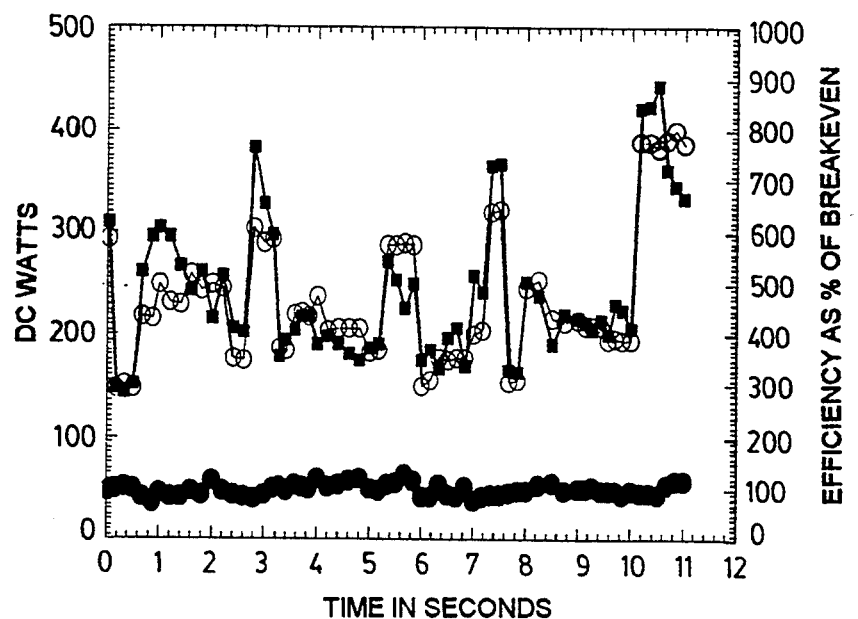

FIG. 20 shows an example of operational measurements taken videographically during a 10 second period for both the power consumption of the drive pack (PAGD input) and the power production captured by the charge pack (PAGD output); the two values are also related by the expression of percent breakeven efficiency.

Figure 21:
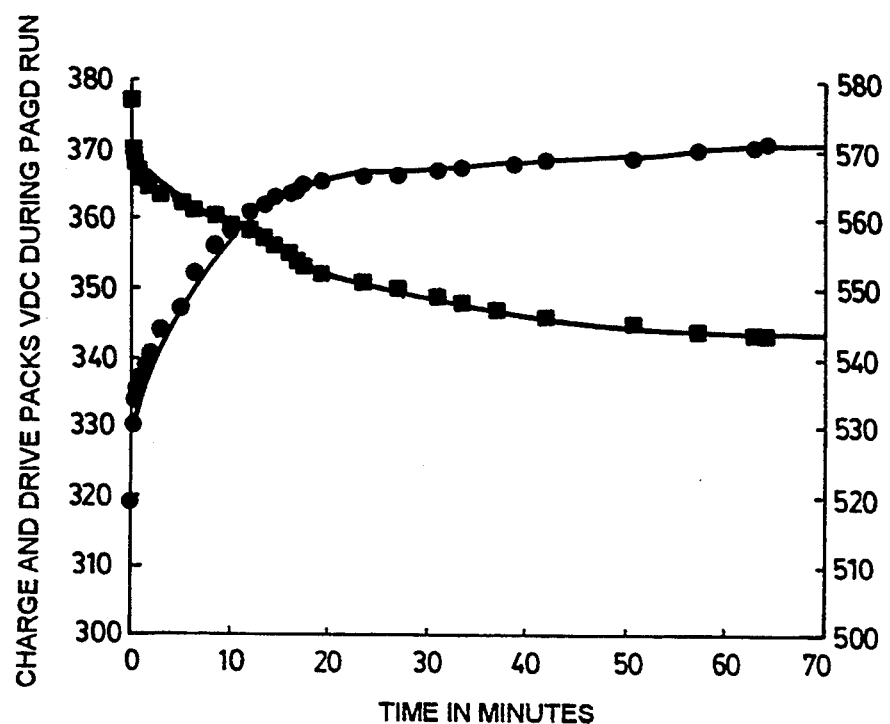

FIG. 21 shows variation of PAGD loaded voltage of a drive pack (in squares) compared with the PAGD charging voltage of the charge pack (in circles), during more than 1 hour of continuous PAGD operation.

DESCRIPTION OF THE PREFERRED EMBODIMENTS

The basic PAGD function and the construction of discharge tubes specifically designed for PAGD operation are described in our corresponding copending applications Nos. 07/922,863 (the '863 application) and 07/961,531 (the '531 application). For purposes of the experiments described below four aluminum H34 plate devices (one with 64 and three with 128 $cm^2$ plate areas) and three aluminum (H200) plate devices (one with 64 and two with 128 $cm^2$ plate areas), with interelectrode gap lengths of 3 to 5.5 cm, were utilized at the indicated vacua, under pumpdown conditions and with either air or argon (ultra high purity, spectroscopic grade 99.9996% pure) constituting the residual gas mixture. The pumpdown conditions were as described in the '863 application. Some experiments were performed with the tubes under active evacuation, at steady-state conditions, while others utilized sealed devices enclosing the desired residual gas pressures.

The circuit designs utilized in the various experiments to be described are set out further below, and represent further developments and extensions of the circuits set forth in the '531 application.

Test equipment utilized was as follows:

An Edwards (trade mark) thermocouple gauge (TC-7) was employed for the determination of pressure down to 1 micron of mercury (0.001 Torr).

Banks of Beckman (trade mark) rms multimeters 225 and 330 (30 and 100 kHz bandwidths, respectively) were utilized for all current measurements.

Frequency meters capable of discriminating events up to 0.1 nanosecond apart, and having adjustable amplitude windows, were used. Direct analysis on a Tektronix (trade mark) dual-trace, storage scope (Model 549) was also carried out for both parameters.

Split-phase, single-phase and two-phase motors were employed, of the synchronous, induction and universal types, as previously described in the '531 application, in the accessory electromechanical arm that may be coupled to the power producing circuit described in the present application.

Large banks of 12 V, 6 Ah lead-acid gel cells (Sonnenschein (trade mark) A212/6S) were utilized either as power sources (designated as drive packs) or as accumulators of the energy (referred to as charge packs) captured by the test circuits. Charge packs made of rechargeable 9 V NiCad or of nominally nonrechargeable C-Zn or alkaline batteries were also utilized.

PAGD emission areas were determined by metallographic examination of a series of craters produced by PAGDs in clean H34 cathodes, under a metallurgical Zeiss (trade mark) standard 18 microscope equipped with an epi-fluorescent condenser, very high power apochromatic objectives and a 100 W mercury lamp. For best results a focusable oblique source of light (12 V halogen) was also added to the incident light.

Figure 1:
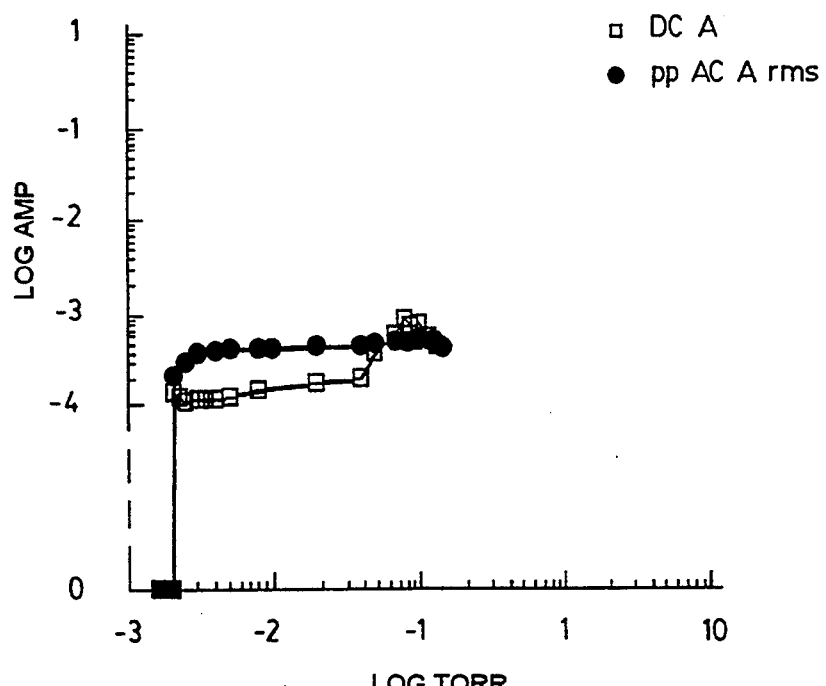
FIG. 1 shows variation of applied DC current and pulse AC rms currents characteristic of a low current PAGD regime, as a function of decreasing pressure, for a 128 cm$^2$ H34 aluminum plate pulse generator having a 5.5 cm gap length and being operated in the single or plate diode configuration of FIG. 11A, at ~600 VDC.
Figure 2:
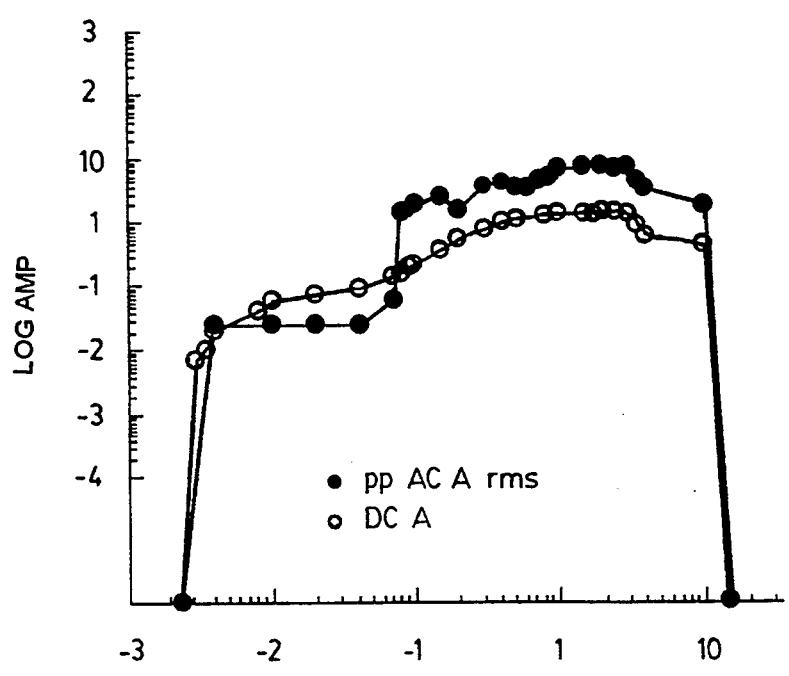
FIG. 2 shows variation of applied DC current and AC rms currents of a high current PAGD regime, as a function of the decreasing pressure, for a device identical to that of FIG. 1, and operated at the same potential.

Following our low and high applied current studies on PAGD production as set forth in the '863 application, we noticed that the AC rms value of the component associated with each abnormal glow discharge pulse varied nonlinearly with the magnitude of the applied current. We originally noted the existence of a current induced shift of the entire PAGD region upward in the pressure scale: while the PAGD regime became more clearly defined as the applied constant DC was increased, the pressure required to observe the PAGD increased two to three orders of magnitude. In the course of these rarefaction studies we found that, at applied currents of 1 mA or less, the rms value of the different AC waveforms associated with the consecutive regimes of the discharge (TRD→NGD→AGD→PAGD) was, by more than half log, inferior to the value of the applied DC current, during the first two regimes (TRD and NGD) and reached a value equivalent to the applied current with the onset of spontaneous PAGD, at pressures <0.1 Torr (see FIG. 1); however, in the downward tail of the PAGD regime (down to $3*10-3$ Torr), the AC rms current component of each PAGD again decreased to more than half log of the intensity of the applied DC value, in a manner proportional to the log of the decreasing pressure. In stark contrast, at high applied currents of ~500 mA, and aside from the high current-induced upward shift in pressure of the PAGD regime (to the point that the compression of the previous regimes on the pressure scale results in their suppressing, as was the case in the present example), the AC rms component associated with each pulse (see closed circles, FIG. 2) is, from onset of the discharge at ~8 Torr, greater in magnitude than the value of the applied current (open circles, FIG. 2). Under the conditions described, the distribution of the field current associated with each pulsed abnormal glow discharge approached (on a linear Y axis; not shown) an unimodal gaussian distribution with the pressure peak at ~1 Torr, and a corresponding observed maximum of $7.5\times$ higher AC rms values than the applied DC values.

We have previously described in the '863 application how the PAGD frequency is affected by several factors, namely: the magnitude of the parallel discharge capacitance, the value of the negative pressure for the relevant vacuum PAGD range, the magnitude of the applied potential, the magnitude of the applied direct current, the interelectrode gap distance and the area of the parallel plate electrodes. In the '531 application we have also described how the wiring configuration (plate diode versus triode) affects the PAGD frequency by adding tungsten autoelectronic emissions from the axial electrode, to those emissions from the plate. There are other factors which limit the PAGD regime of discharge and have also been discussed in the '863 application. The following data indicates their specific effect upon PAGD frequency.

Figure 9:
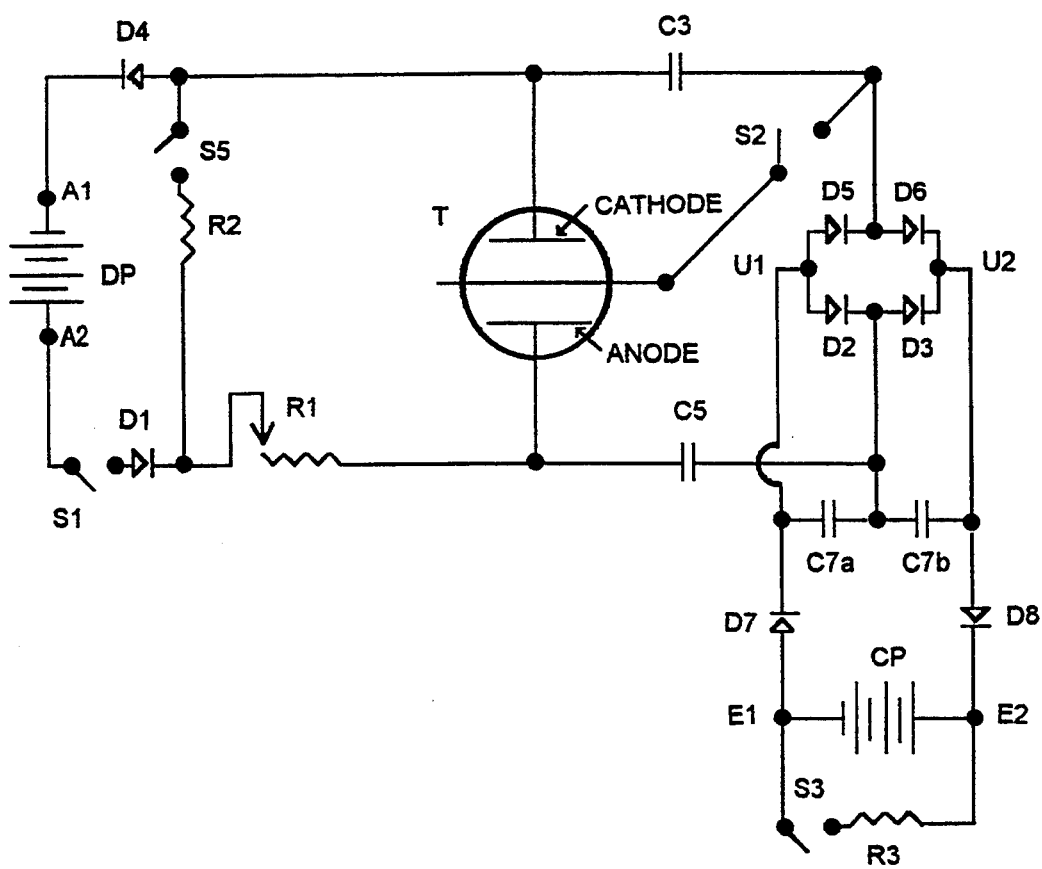
FIG. 9 is a schematic diagram of a preferred diode or triode PAGD circuit in accordance with the invention.

In the data presented in Table 1, control of the frequency parameter for the circuit shown in FIG. 9 is by a ballast resistance R1 within a specific range of interest (~800-150 ohms, for Table 1 experimental conditions), and this in turn increases the applied current which, at "high current" values (i.e. >100 mA, as for Table 1 conditions), will drive the PAGD frequency up, as previously reported in the '863 application.

Table 2 shows the effect of the progressive displacement of a given frequency, chosen as 200 PPS, with the cumulative pulse count of the same device, in the plate diode configuration. This displacement of the same frequency (cf. group #'s 1-3, Table 2) onto higher pressure regions is shown to be promoted by the alteration of the work function of the PAGD emitting cathode, such as this is caused by the cumulative pulse count and resultant crater formation on the electrode surface. After the first million pulses, the anode facing cathode surface is completely turned over by emission sites, and this corresponds well to the threshold crossed by group #2, Table 2. Once the cathode surfaces are broken in, the rates shown in groups #3 and 4, Table 2, tend to remain constant. Originally we wondered whether this might be caused by the alteration of the electrostatic profile of the plasma sheaths at the periphery of the envelope, due to the mirroring deposits that result from the sputter of ions and trapped neutral atoms (from air gases or metallic vapor) associated with the autoelectronic emission mechanism (and from further emissions triggered in turn, by secondary ionic bombardment of the cathode with molecular species present in the plasma ball formed over the primary emission site). However, reversal of the plate polarity (firing the ex-anode as a crater-free cathode) for over a million counts, followed by re-reversal to the original polarity, the entire operation being performed in air as the residual gas substrate, led to the partial recovery of the original work function for as long as the test was run ($1.5*10^4$ pulses), as shown by a comparison of groups #2,4 and 5, Table 2. From a metallographic examination of the surfaces of plates used solely as anodes, we have also concluded that prolonged PAGD operation has the effect, not only of cleaning the anode surface from surface films and adsorbed gases, as ionic bombardment promoted by electromagnetic induction coils does, but it also does more—it polishes the target surface and smooths it by a molecular erosive action. Observations of the surface of reversed cathodes, shows the same smoothing and polishing effects observed in exclusive anodes. Thus the recovery of the PAGD rates promoted by polarity reversal of the plates is not a function of the sputter-promoted mirroring deposits on the envelope wall, but a function of the actual workfunction of the emitting cathode.

Another variable that interacts with the PAGD frequency is the molecular nature of the residual gas: Table 3 shows the differential frequency response of air with a halogen quencher, argon, for the same pulse generator employed in the tests of Table 2. It is apparent that argon obtains much higher rates of AGD pulsation for the same range of negative pressure, for the same "broken in" cathode, than does the air mixture. All these measurements were taken at cathode support-stem temperatures of 35° C.

Figure 3:
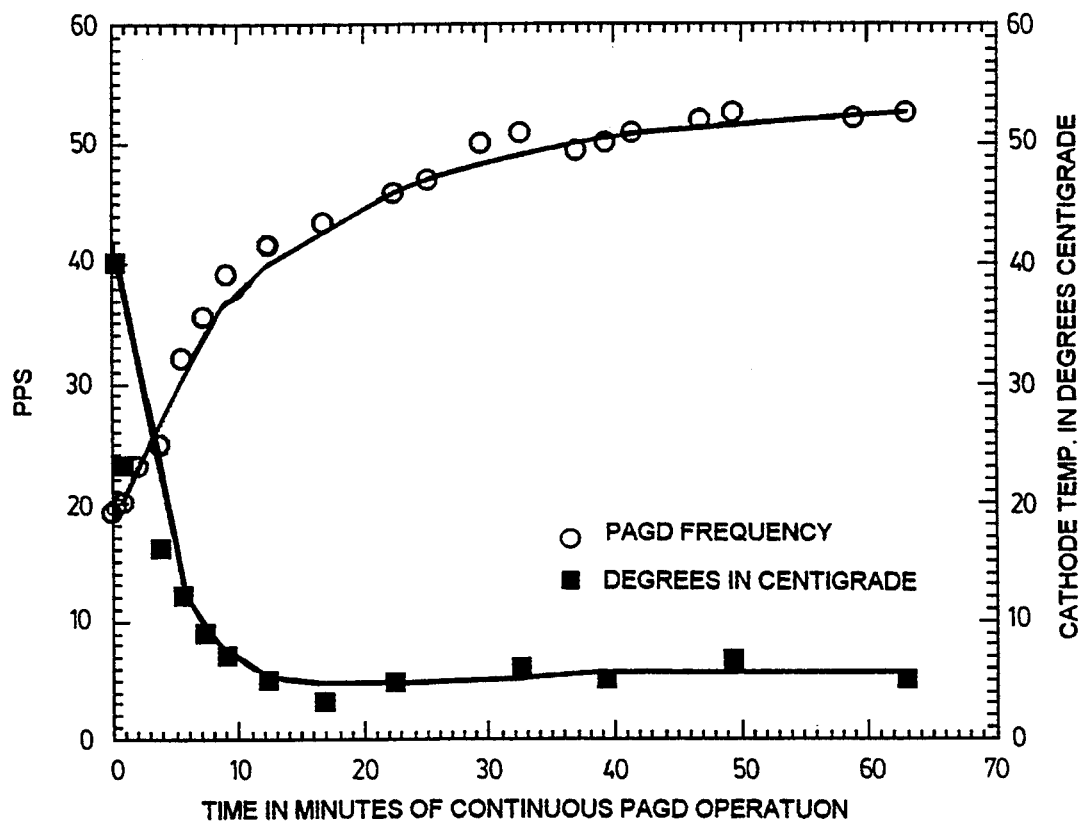
FIG. 3 shows PAGD rate vs. pulse generator cathode temperature as a function of the time of continuous PAGD operation, for a pulse generator with 64 cm$^2$ plates having a 4 cm gap distance, operated at VDC=555 (av) and R1=600 ohms (see FIG. 9).

Time of operation is also a variable affecting the frequency and operating characteristics of the cathode, as it becomes expressed by the passive heating of the cathode, an effect which is all the more pronounced at the higher pressures and at the higher frequencies examined. Utilizing the triode circuit discussed in the next section, the pulse rate of a PAGD generator with 64 $cm^2$ plates can be seen (see FIG. 3) to decrease, at a negative pressure of 0.8 Torr, from 41 PPS to the operating plateau of 6 PPS within 15 minutes of continuous operation, as the temperature of the cathode support increased from 19° to ~44° C. As the temperature plateaus at ~51°±1° C., so does the pulse rate at 6 PPS, for the remaining 48 minutes of continuous operation.

Figure 4:
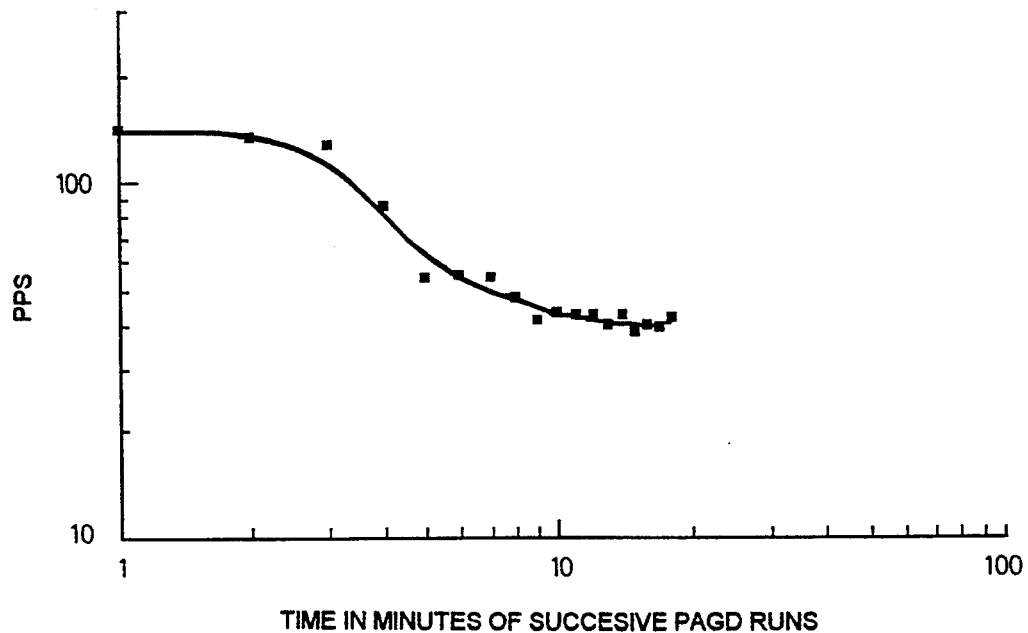
FIG. 4 shows PAGD frequency variation with time, for 18 successive spaced one-minute PAGD runs for a pulse generator with 128 cm$^2$ plates, and a 5.5 cm gap distance, operated at VDC=560 (av) and R1=300 ohms.
Figure 5:
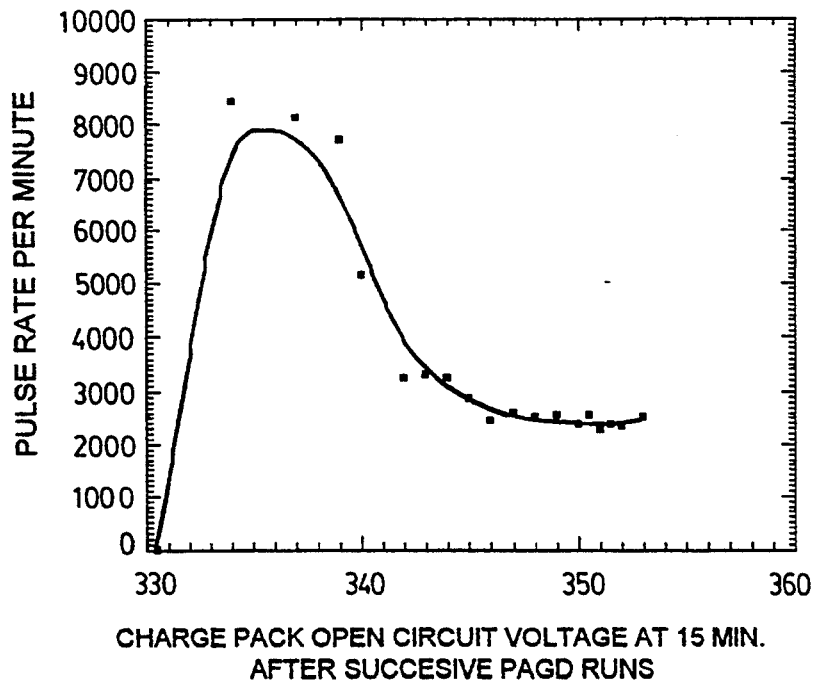
FIG. 5 shows variation of the PAGD frequency in pulses per minute (PPM) with increasing charge of a PAGD recovery charge pack (see FIG. 9), as measured in terms of the open circuit voltage following 15 minutes of relaxation after each one minute long PAGD run, repeated 18 times in tandem, under similar conditions to FIG. 4.

However, in order to confirm this time-dependent heating effect and threshold, we also performed the same experiment, utilizing the same circuit and the same negative air pressure, with twice as large a cathode area (128 $cm^2$, which should take nearly twice as long to heat), being operated for 18 one-minute long continuous periods equally spaced apart by 15 minutes of passive cooling, with the cathode stem always at 19.7° to 21° C., room temperature at the start of each period. The results surprised us, inasmuch as they showed that for a larger area tube which takes longer to heat to the same temperatures at comparable rates of PAGD triggering, one could observe a much earlier frequency reduction (by half, within the first 5 minutes or periods of interrupted functioning) in the absence of any significant heating effect (<1.5° C.) of the cathode (see FIG. 4). Repetition of these experiments has led us to conclude that, as shown in FIG. 5, the variable responsible for this repeatedly observed reduction in the PAGD frequency, when the PAGD operation sequence is systematically interrupted, is the state of charge/discharge of the battery pack (the charge pack) at the output of the triode circuit in question: the PPM rates in FIG. 5 decrease rapidly with the steepest rate of charging of the charge pack and the fastest recovery rate of its open circuit voltage; above a given state of charge, when the open voltage of the charge pack climbs more slowly (>340 V), in a log fashion, the PPM rate stabilizes at its plateau values.

Confirmation of the importance of the charge pack in the PAGD function of the present circuitry here considered, comes from the fact that the size (the number of cells) and the intrinsic capacitance of the charge pack affect the PAGD frequency dramatically (see Table 4): increasing the charge pack size of 29 cells to 31, by 7% leads to a 10-fold reduction in frequency; further increases in the number of charge pack cells extinguishes the phenomenon. On the upper end of the scale, this effect appears to be tied in to restrictions that it places on the ability of the larger charge packs to accept the discharge power output once the charge pack voltage exceeds the PAGD amplitude potential. All of these measurements were conducted with the same 128 $cm^2$ plate PAGD generator, at a pressure of 0.8 Torr and in the triode configuration (see FIG. 9).

Other factors can also affect the frequency: the motion of external permanent magnetic fields oriented longitudinally with the interelectrode gap, external pulsed or alternating magnetic fields, external electrostatic or electromagnetic fields, specific connections of the earth ground, and the presence of a parallel capacitative, capacitative-inductive or self-inductive arm in the circuit, such as we have described for our electromechanical PAGD transduction method as described in the '531 application.

Figure 6:
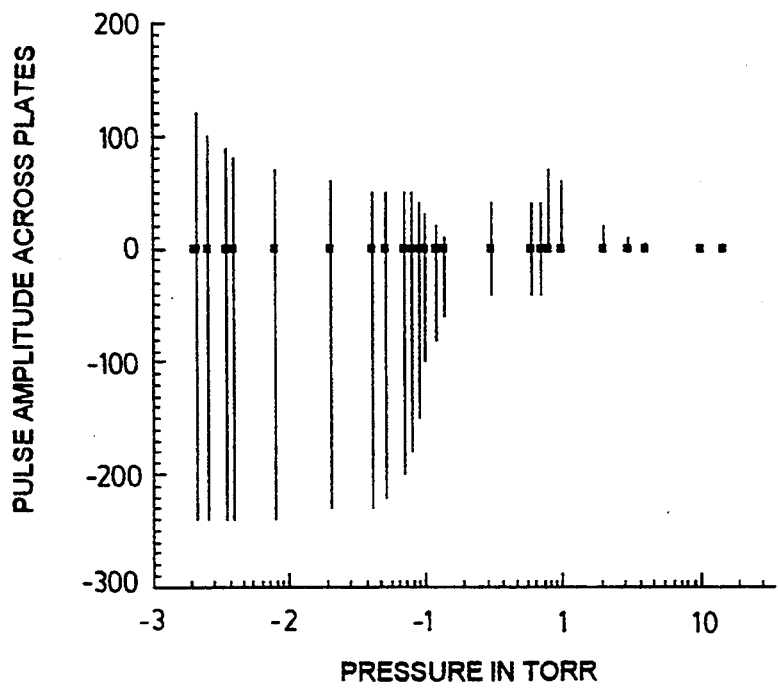
FIG. 6 shows volt amplitude variation of continuous PAGD at low applied current, as a function of decreasing air pressure, for a 128 cm$^2$ plate area device, gap length=5 cm; (DCV at breakdown=860).
Figure 7:
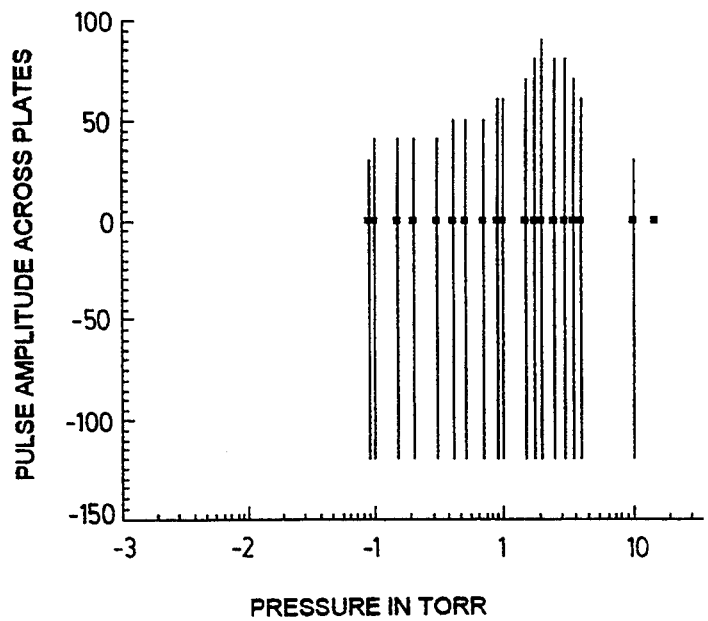
FIG. 7 shows volt amplitude variation of continuous PAGD at high applied current as a function of the decreasing air pressure, for a 128 cm$^2$ plate area device, gap length=5 cm; (DCV at breakdown=860).

Analysis of the modulation of PAGD amplitude is simpler than that of its frequency, because fewer factors affect this parameter: (1) magnitude of the applied potential, (2) interelectrode gap distance and (3) the negative pressure, as shown in the '863 application, for "low" applied currents. As the magnitude of the applied potential itself is limited by the gap and the pressure, to the desired conditions of breakdown, the important control parameter for the PAGD amplitude is the pressure factor. This is shown in FIGS. 6 and. 7, respectively for "low" (5 mA) and "high" (~500 mA) applied currents and for the same plate diode configuration of a H34 Al 128 cm$^2$ plate PAGD generator (5 cm gap), in the simple circuit described in the '863 application; it is apparent that both positive and negative components of the amplitude of these pulses in the oscillograph, are a function of the pressure, but the maximum cut-off limit of our equipment, for the negative component (at 240 volts for the "low" current experiment and at 120 volts for the "high" current), precluded us from measuring the peak negative voltage of these pulses. However, rms measurements of the pulse amplitude at the plates and DC measurements at the circuit output to the charge pack indicate that the negative component increases with decreasing pressure to a maximum, for a given arrangement of potential and gap distance; no pressure-dependent bell shape variation of the pulse amplitude, as that seen for the positive component at "high" applied currents (FIG. 7) is observed with the negative amplitude component. For the typical range of 0.8 to 0.5 Torr, the rms value for pulse amplitude varies from 320 to 480 volts, for a 5.5 cm gap distance and applied DC voltages of 540 to 580. PAGD amplitude is a critical factor for the design of the proper size of the charge pack to be utilized in the optimal circuit.

Figure 8:
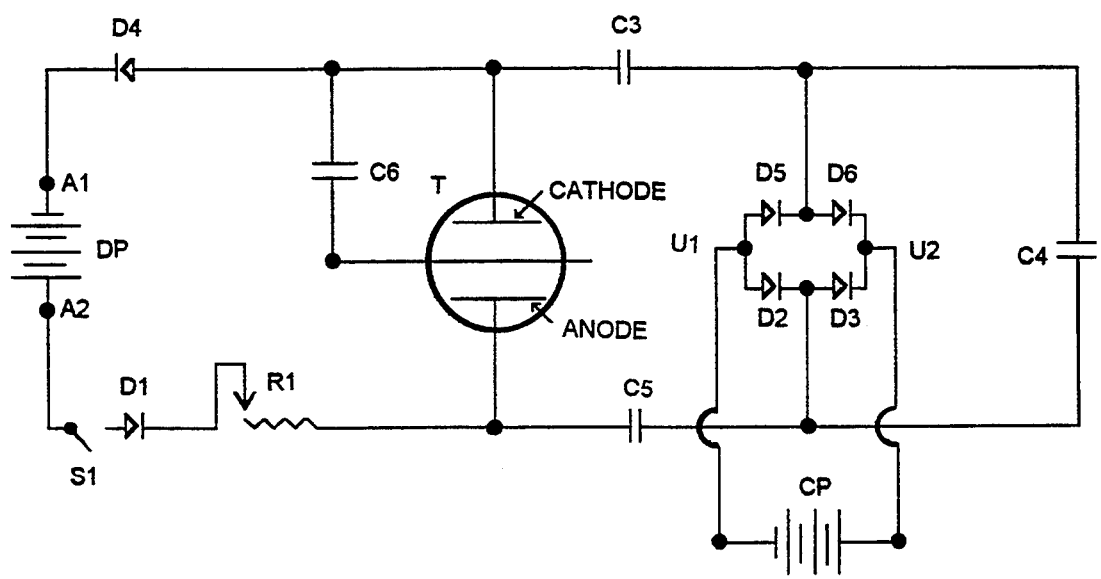
FIG. 8 is a schematic diagram of a first experimental diode (without C6) or triode PAGD circuit.

The development of the circuits to be described stemmed from fundamental alterations to the principles implicit in our previous methods of electromechanical transduction of AGD plasma pulses as described in the '531 application. Whereas this electromechanical coupling (capacitative and self-inductive), utilized directly, energizes the AGD pulses inverted from the DC input by the vacuum generator, the purpose of the development that led to the presently described experiments was to capture efficiently, in the simplest of ways, most of the pulse energy in a closed circuit, so that power measurements for the energy transduction efficiency of the observed endogenous pulsation could be carried out. Ideally, comparative DC power measurements would be performed at both the input and output of the system, taking into account the losses generated across the components; this would obviate the measurement problems posed by the myriad of transformations implicit in the variable frequency, amplitude, crest factor and duty-cycle values of the PAGD regime, and necessitated some form of rectification of the inverted tube output. From the start our objective was to do so as simply as possible. Early circuits utilizing half-wave rectification methods coupled in series to a capacitative arm (for DC isolation of the two battery packs), with the charge pack also placed in series, showed marginal recoveries of the energy spent at the PAGD generator input. Attempts at inserting a polar full-wave rectification bridge led, as shown in FIG. 8, to the splitting of the capacitor into capacitors C3 and C5, at the rectification bridge input, and capacitor C4 in series with both capacitors, all three being in a series string in parallel with the PAGD generator. Under these conditions a DC motor/generator could be run continuously in the same direction at the transversal output (U1 and U2) of the bridge; but if this inductive load was replaced with a battery pack CP (charge recovery pack), either the parallel capacitor C4 had to remain in the circuit, for the diode configuration or, less desirably, a further capacitor C6 could replace C4 and connect one electrode, preferably the cathode C, to the axial member of the discharge tube T, thus resulting in a first triode configuration as actually shown in FIG. 8. Energy recovery efficiencies of the order of 15 to 60% were obtained utilizing C6 in this manner, but measurements of the potential and currents present at the output from the rectifier bridge were substantially lower than those obtained using optimal values of C4. Effectively, under these conditions, much of the power output from the tube was never captured by the output circuit formed by the second, right hand arm of the system and, being prevented from returning as counter-currents to the drive pack DP by diodes D1 and D4, was dissipated and absorbed by the interelectrode plasma, electrode heating and parasitic oscillations.

Solutions to this problem were explored using the circuit shown in FIG. 9, which still maintains the necessary communication link for the quasi-sinusoidal oscillation of the capacitatively stored charges at the input and outputs of the rectification bridge, but integrated the functions of capacitor C4 into the single rectification circuit, in the form of an asymmetric capacitative bridge C7a and C7b placed transversally to the capacitative bridge formed by C3 and C5 and in parallel with the charge pack CP at the output from the rectification bridge D5, D6, D2, D3. This second capacitative bridge is so disposed as to have its centre point connected to the anode A through capacitor C5. If the axial member of the Tube T were to connect to the junction of D2 and D3 instead of at the junction D5–D6, the function of bridge C7a and C7b would be connected to the cathode C through capacitor C3. The capacitative bridge is insulated from the charge pack whose voltage it stabilizes, by rectifiers D7 and D8, which also prevent leakage of charge across C7a and C7b. The anode and cathode oscillations generated by the electrostatic charge transduction through C3 and C5 into the poles of the charge pack are trapped by the transversal transduction of the C7 bridge, at the outputs from the rectification bridge, of which the oscillation has to become split between the bridge inputs into half-waves, for electrostatic transduction and full wave rectification to occur. In fact, under these conditions, removal of the C7 bridge will suppress the PAGD phenomenon, unless other circuit variables are also altered. The transversal bridge is thus an essential piece of this novel circuit. Variations in the circuit as shown in FIG. 10 were then studied, the first two being selectable utilizing switch S2 (FIG. 9).

The presence of the capacitative bridge effectively reduces the dynamic impedance of the charge pack CP so that the output circuit approximates to a characteristic in which it presents a very high impedance to the tube T at potentials below a certain level, and a very low impedance at potentials above that level.

With this modified circuit, more effective recovery of the energy produced by collapse of the PAGD pulses is possible, with more effective isolation from the input circuit utilized to trigger the pulses. Under these conditions, the energy captured by this circuit at the output, is not directly related to that utilized in triggering the pulses from the input. The attainment of this condition critically depends on the large capacitance of the transversal bridge being able to transfer the output energy from the tube T into the charge pack CP. Under these conditions, we have found, as will be shown below, that the large peak pulse currents released by collapse of the PAGD pulses released more energy than is used to trigger them, and these findings appeared to tally with other observations (abnormal volt-ampere characteristics and anomalous pulse currents, etc.) associated with the anomalous cathode reaction forces that accompany the auto-electronic emission-triggered PAGD regime. Experiments so far indicate that the power output can be increased proportionately to the series value of C3, C5 and the two identical C7 capacitors.

Figure 10A:
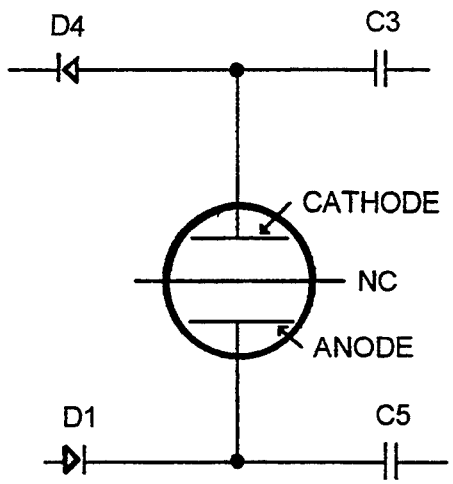
FIGS. 10A, 10B and 10C are fragmentary schematic diagrams showing variations in the configuration of the circuit of FIG. 9.
Figure 10B:
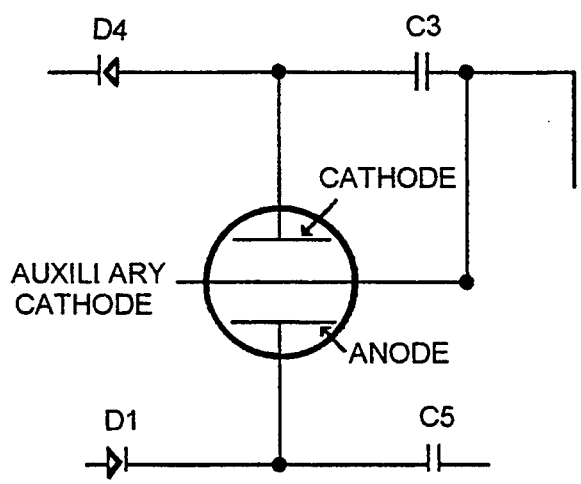
Figure 10C:
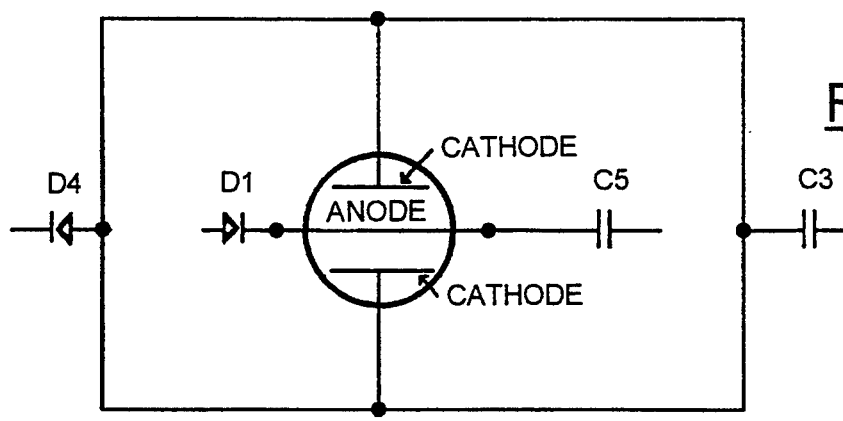
Figure 11:
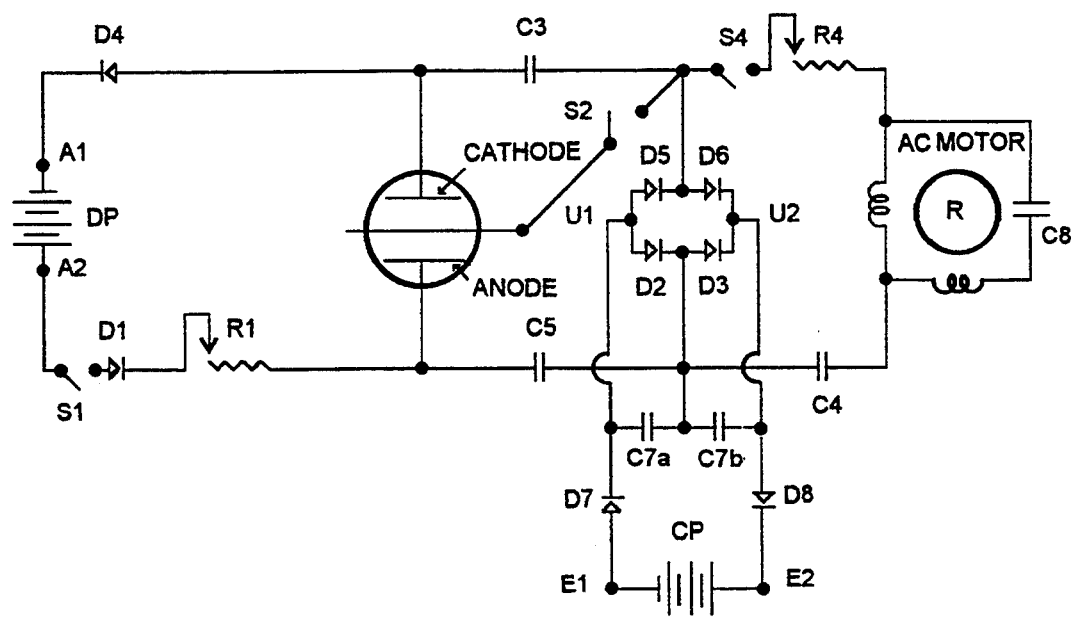
FIG. 11 is a modification of FIG. 9, in which an electromagnetic machine, in the form of an electric motor, is connected into the circuit as an accessory electromechanical arm.

The circuit of FIG. 10 can be integrated with a circuit such as that disclosed in the '863 application as shown in FIG. 11, in which a part of the energy recovered can be shunted by the switch S4 into an induction motor M1 having rotor R, to a degree determined by the adjustment of potentiometer R4 and the value selected for C4.

Figure 12:
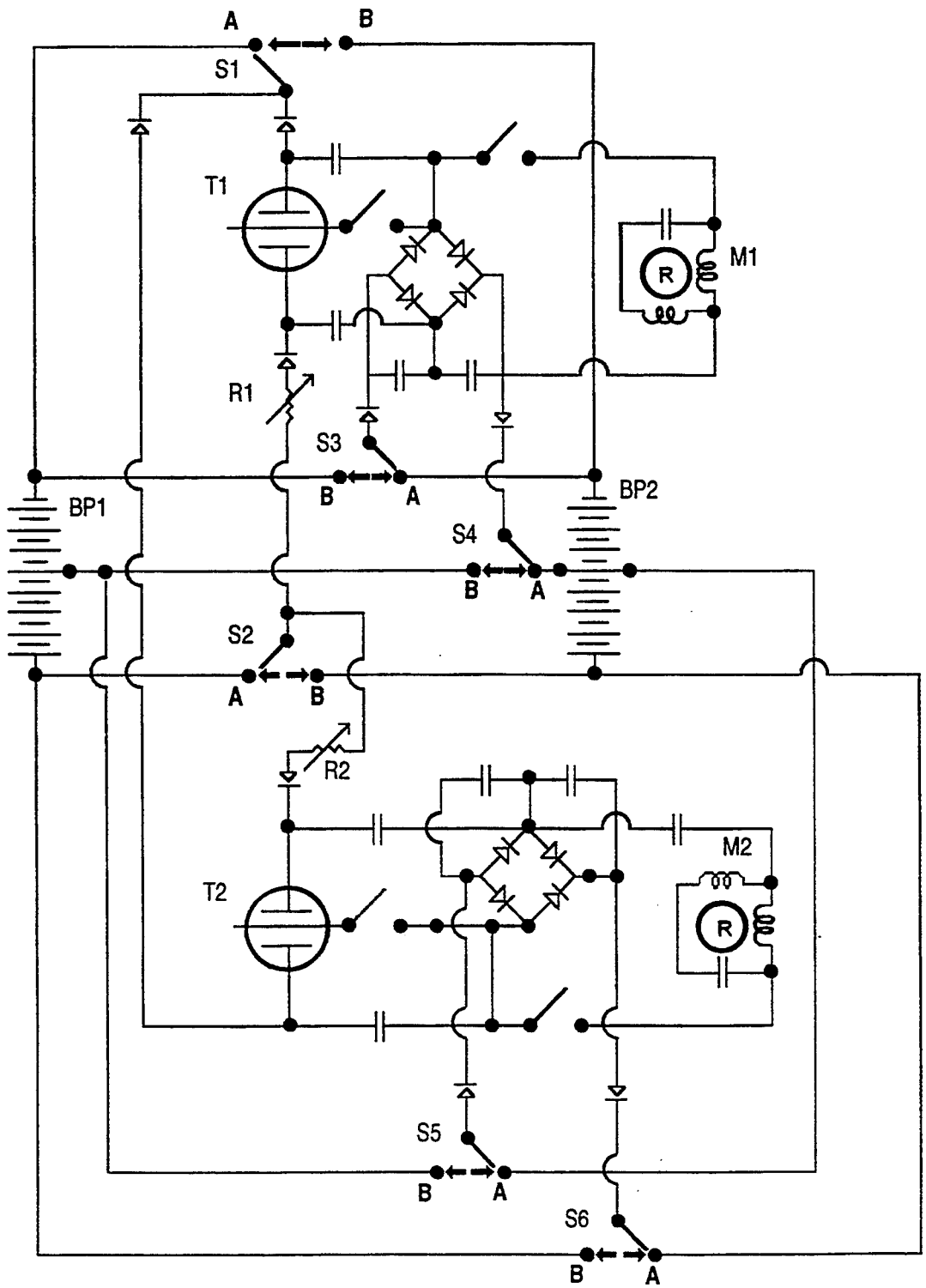
FIG. 12 shows a further development of the circuit of FIG. 9, permitting interchange of driver pack and charge pack functions.

The circuit of FIG. 11 can be further developed as exemplified in FIG. 12 to include configurations which provide switching permitting interchange of the functions of charge packs and the drive packs, it being borne in mind that the nominal potential of the drive pack must be substantially higher than that of the charge pack, the former needing to exceed the breakdown potential of the tube at the beginning of a PAGD cycle, and the latter to be less than the extinction potential.

FIG. 12 essentially represents a duplication of the circuit of FIG. 11, the two circuits however sharing two identical battery packs BP1 and BP2, and being provided with a six pole two way switch, the contact sets of which are identified as S1, S2, S3, S4, S5 and S6. When the contacts are in position A as shown, battery pack BP1 acts as a drive pack for both circuits, with the upper half (as shown) of the battery pack BP2 forming the charge pack for the upper circuit, and the lower half forming the charge pack for the lower circuit. When the pack BP1 is at least partially discharged, the switch is thrown so that contacts move to position B, which reverses the function of the battery packs thus allowing extended operation of the motors in each circuit each time the switch is thrown.

Based on the manufacturer's data, and using current values within the range of our experimentation as discussed in the next sections, an optimal discharge cycle for a fully charged 6.0 Ahr battery pack at 0.300 A draw is 20 hours, as claimed by the manufacturer, and this corresponds to a cycling between 100% (12.83 V/cell open circuit and load start voltage) and <1% (10.3 V/cell load voltage) of the battery's absolute charge capacity. Even though the discharge mechanism is a time cumulative process with a log function, the discharge can, within 4 to 5 hour time segments (or periods with 20-25% of the full range), be regarded as practically linear with time. This trait, or linearization of the discharge slope, becomes more marked with advancing age and decreasing absolute storage capacity of the cells.

The proportionality between open circuit voltage and the percentage of residual relative capacity for these cells when new (uncycled and not yet aged) is uniform over 98% of the permissible charge capacity withdrawal; in practice this translates into a slope that becomes steeper with time, while the absolute storage capacity diminishes. In turn, this decreasing absolute capacity of the cells results in shorter load discharge times and their further linearization.

A circuit in .general accordance with FIG. 9, employed in the studies reported in this and the following sections, utilizes a drive pack of 46*12 V Lead acid gel-cells each with a 6.0 Ah rating, and a charge pack with 28 or 29*12 V identical cells. The charge pack was cycled anywhere from 11.2 V to 12.8 V/cell (open circuit voltages), within the proportional region of the relative capacity slope, to yield a capacity increment in the order of 50% (e.g. from 20 to 70%), anywhere within the range of 2 to 100% of its total charge capacity, assumed for now as invariant. The charging process, hereinafter referred to as a PAGD run, took about 20-30 minutes under optimal conditions. The drive pack typically consumed, in the same period of time, 4 to 11% of its initial total capacity, its open circuit voltage typically falling 0.1 to 0.2 V per cell after a PAGD run, within the open circuit range of 12.8 V/cell (100% relative capacity) and 11.2 V/cell (~2%). At the 100% capacity benchmark, the drive pack would theoretically have 20 h*46 cells*12.83 V/cell*0.3 A=3.5 KWh, and the charge pack, for example, 20 h*29*12.83 V/cell*0.3 A=2.2 KWh. Since the capacity per cell is linear with the open circuit voltage within the proportional range, as claimed by the manufacturer, we projected the open circuit voltage intercepts on the manufacturer's proportional curve in order to determine the residual percentage of the total relative capacity and the standard hours of operation left, from any experimental open circuit voltage measurements.

Three pulse generators (2*128 cm² and 1*64 cm² plate areas) were employed in these studies; they were operated in PAGD runs at 1-120 pulse/second rates, within a negative pressure range of 0.2 to 0.8 Torr and with applied direct currents of 0.2 to 0.6 A.

Both drive and charge packs utilized cells which were bought new at the same time and had initial charge values of 12.4 to 12.55 V/cell (open circuit). These batteries are capable of energy densities of 33-35 Whr/kg. However, the experiments shown in Table 5 are selected from a series that spanned nearly 12 months, beginning 6 months after purchase; hence, loss of absolute storage capacity by the batteries had occurred in the intervening time, as a function of both age and charge/discharge cycle life.

Measurements of the open voltage of either drive (D) or charge (C) (see column 2, Table 5) packs for 8 separate experiments, all utilizing the triode configuration, were performed before (b) and after (a) a PAGD run (see columns 3 and 4), at either 15 or 30 minutes (see column 26) of the open circuit voltage relaxation after a PAGD run was terminated. Corresponding open circuit voltages per cell are shown in column 5, and the percentages of the predicted total relative charge capacity resulting from the intercepts on the manufacturer's proportional curve are shown in column 6, Table 5. Equivalent maxima for the theoretical hours of operation left are shown in column 7, the percentage change in relative capacity arising as a consequence of either charge pack charge capture (capacity gained) or of drive pack output (capacity lost) is shown in column 8. Translating the intercepts into power units yields the values shown in column 9, Table 5, for total kWh left in each pack before and after PAGD production, those shown in column 10 for the actual power gained and lost during the periods of operation (presented in column 12) and those shown in column 13 for the power predicted to be gained or lost per hour of PAGD production. On the basis of the experimental open voltage values and their intercepts, the predicted net kWh values per hour of PAGD energy production (after deduction of measured losses) and the corresponding experimental breakeven efficiencies (where breakeven=100%) are presented, respectively, in columns 14 and 15. The PAGD frequency per second is shown in column 11; the number of 12 V cells, in column 16; the tube ID, in column 17; the cathode (and anode) area (s), in column 18; the plate material, in column 19; the input ballast utilized (R1, FIG. 9), in column 20; the size of each capacitor (C3 or C5) of the tube output bridge, in column 21; the size of each capacitor (C7a or C7b) of the transversal capacitive bridge, in column 22; the status of S4 and thus, of the parallel and auxiliary electromechanical arm (see FIG. 11), in column 23; the negative air pressure in column 24; the gap distance between the plates, in column 25; and columns 27,28 and 29, show the status of the elements of the switched on parallel electromechanical arm of the circuit—the parallel C4 capacitor, the motor input resistor R4 and the motor revolutions per minute (measured stroboscopically), respectively.

From these figures of Table 5, and utilizing the data for the two first examples shown, we calculated the predicted performance of the system based on the open voltage measurements. In the first example, where the system was run continuously without interruption, the charge pack increased the percentage of its total capacity by 43% (a two-fold increase in capacity) and, during the same period, the driver pack decreased the percentage of its total capacity by 7% (a ~10% decrease in capacity relative to the percentage of residual total capacity at the start, i.e. 77%) (cp. columns 6 and 8, Table 5). Subtracting the predicted initial total energy (0.835 KWh) available to the charge pack before the experimental run (first line of column 9, Table 5) from the predicted total energy (1.823 KWh, second line of column 9) available to the charge pack after the PAGD charge run, gives us the total energy gained by the charge pack: 0.988 KWh (column 10) in 21.5 minutes (column 12) of continuous PAGD performance. Conversely, subtracting the predicted final total energy (2.4 KWh) available to the driver after the experimental run (fourth line of column 9, Table 5) from the predicted total energy (2.66 KWh, third line) available to the driver before the PAGD charge run, gives us the total energy lost by the drive pack: 0.26 KWh in 21.5 minutes. If we divide the total available energy gained by the charge pack, by the total energy lost by the drive pack, we obtain a surplus factor of 3.9×, or 388% of the breakeven point (column 15). The same values result from dividing the charge pack % of total capacity gain by the drive pack % of total capacity lost, and then downscaling this value by multiplying it by the typical scale factor for the two packs, 29/46=0.63×.

In an analogous fashion, we analyzed the results for the second example shown in Table 5. Here, the charger increased the percentage of its total capacity by 45.5% (a 22.75 fold increase in estimated total relative capacity) and, during the same period, the driver decreased the percentage of its predicted total capacity by 7% (a ~17.5% decrease in capacity relative to the percentage of residual total capacity at the start, i.e. 40%). By dividing the predicted total available energy gained by the charge pack (0.962 KWh/18 minutes) by the expected total energy lost by the driver pack (0.246 Kwh/18 minutes) we obtain a surplus factor of 3.9×, or 391% of the breakeven point. This corresponds to an interrupted, total sequential run of 18 minutes, each minute-long run being separated by a cooling and voltage relaxation period of 15 minutes before the next run is carried out, at an average PAGD frequency of 61 PPS.

Analysis of the remaining results illustrates how a number of PAGD controlling parameters interact to determine conditions for effective maintenance of a PAGD regime. The lower gain and higher loss per unit time registered for the third run of Table 5, which results in the lower breakeven efficiency of 230% and a smaller net power production rate than before (power estimates of 1.396 kWh/h of PAGD operation vs 2.387 kWh/h, for the second run, Table 5) illustrate, for example, the combined effect of lowering the pressure (0.8 to 0.7 Torr) and running the PAGD continuously (the heating effect), both of which depress the PAGD frequency. The fourth run of Table 5 identifies the continuous performance of a "broken in" softer grade of aluminum (column 19), having a lower work-function (as determined from the higher PAGD frequency spectrum) than the harder H34 plates of the previous examples, and shows that, despite the series value of the total capacitance being higher (5,333 mfd vs 4,030 mfd for runs one through three), and despite the higher vacuum (0.2 Torr), the lower work-function results in a higher frequency; however, even though this run registers a predicted higher breakeven efficiency (310%) than the previous experiments, these conditions result in a 4/5-fold lower estimate of net power produced, when compared to the previous three PAGD runs.

PAGD runs 5 and 6, Table 5, illustrate the effect of switching on the auxiliary electromechanical arm of the circuit shown in FIG. 11. Increasing the amount of charge capacitatively shunted into the electromechanical arm by higher C4 values (column 27), and increasing the current that feeds the squirrel cage induction motor utilized by lowering R4 (column 28), results in a power capture by the charge pack that registers an energy loss (predicted to be 96% efficient, falling short 4% of breakeven recovery), as most of the tube output power is spent in the electromechanical arm and its motor effect. Furthermore, under the conditions of maximum electromechanical action, the drain imposed on the drive pack becomes considerable (see loss in columns 10 and 13), even if the C3 and C5 values are reduced, column 21, Table 5). These runs also illustrate how the motor appears to function as an electrical induction generator having rpm values much higher than the synchronous values prescribed by the frequency of the PAGD (column 29, Table 5).

The extremely large breakeven efficiency of PAGD run 5, Table 5, indicates that with selected values of C4 and R4, it is possible to operate the motor in the auxiliary arm and still accumulate excess energy from the PAGD production in the charge pack.

Runs 7 and 8 illustrate results obtained for 64 cm$^2$ plates, and a shorter interelectrode gap distance, for two pressures (0.8 and 0.5 Torr), the device being open to a rotary pump manifold in the first instance and sealed from the pump, in the second case. Despite the lower vacuum, the higher pulse frequency (32 vs 5 PPS) and breakeven efficiency (906% vs 289%) registered by run 8 when compared to run 7, are a consequence of the method of run 8, which was interrupted systematically by 5 passive cooling periods, as in the case of run 2, whereas run 7 was continuous. This again resulted in higher average PAGD frequencies (at lower pressures), a predicted two-fold greater gain and a predicted two-fold smaller loss (columns 13 and 14) for run 8.

Figure 13:
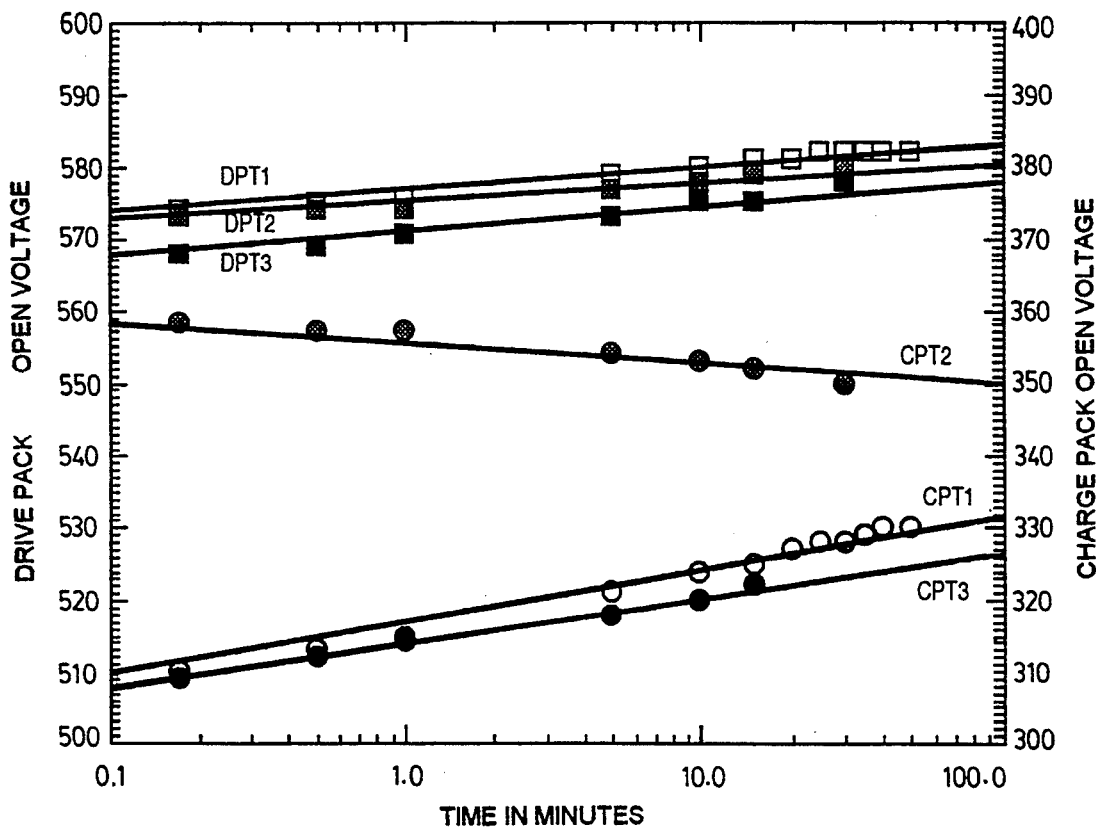
FIG. 13 shows open circuit voltage relaxation curves for battery packs employed in tests of the invention, respectively after pre-PAGD resistive discharge (DPT1 and CPT1), after a PAGD run (DPT2 and CPT2) and after post-PAGD resistive discharge (DPT3 and CPT3).

FIG. 13 shows curves representing the slopes of the open circuit relaxation voltages, which are linear with the log of time elapsed from cessation of discharge, for both drive and charge packs, in the same run 8 set out in Table 5. The experiment in its entirety consisted of 5 preliminary resistor-loaded measurement discharges and their corresponding open circuit voltages from the moment of cessation of the resistive discharge (illustrated, respectively, by the open squares of DPT1 for drive pack relaxation time 1, and by the open circles of CPT1 for charge pack relaxation time 1), followed by their relaxation rates in the wake of the PAGD production (the hatched squares of DPT2 for drive pack relaxation time 2, and the hatched circles of CPT2 for charge pack relaxation time 2), and finally, by the relaxation rates from the final resistor-loaded measurement discharges (the black squares of DPT3 for drive pack relaxation time 3, and the black circles of CPT3 for charge pack relaxation time 3). Discharge resistances were 833 ohms for the charge pack, and 2083 ohms for the drive pack in all cases, corresponding to resistors R3 and R2, respectively, of FIG. 9. This methodology will be examined in greater detail below. It is apparent that, after every load period, be this resistive (CPT1, DPT1, CPT3 and DPT3) or due to PAGD operation (DPT2), the relaxation slope is positive; as shown from slopes CPT1 and DPT1, the log time proportionality of the open circuit voltage relaxation, under these conditions, tends to plateau after ~30 minutes. The exception to this general behaviour lies in the voltage relaxation slope CPT2, which is negative and reflects the charge accumulation occurring in the charge pack and obtained by capture of energy produced during PAGD operation, triggered by the energy drawn from the drive pack during load time 2.

As a first approximation of electrical power generated and consumed by the energy conversion system of the invention, the previous open circuit voltage method is of significance in showing the basic trends involved in interaction of the operating parameters. However, in all likelihood, it overestimates the actual values of electrical power consumed and generated, for a variety of reasons. First, it assumes that the relative capacity scale of the batteries in the drive and charge packs is an absolute charge capacity scale with an invariant maximal charge retention, which it is not; in fact, the absolute charge capacity is itself a variable subject to several factors, such as the cycle life, overcharging or undercharged conditions, cell age, residual memory and the rate of charge and discharge. Hence, the inference of a uniform time scale on the basis of the open circuit voltage/capacity intercepts may not be warranted. Finally, it does not integrate the open voltage decrease over time, and utilizes the specification load current as the average current over time.

In order to obviate these problems, we resorted to a variety of other measurement methods. First, we proceeded to compare the closed circuit, preliminary, resistive-load discharge measurements for either charge or drive pack, under conditions of negligible loss of power, as these measurements were statistical means (n=9) taken, at equal intervals, during the first 90 seconds of the load discharge, and obtained both just before the PAGD production runs (but separated from each PAGD run by an open circuit voltage relaxation of 30 minutes) and just after the runs (but equally separated by a relaxation of 30 minutes). As an example of the data generated by such an approach, FIG. 14 illustrates the shift of the slopes indicating marginal power loss for the drive pack (from the closed squares to the open squares) and those indicating gain of power for the charge pack (from the open circles to the closed circles), in actual total load power values.

Integration of these power measurements over the projected load discharge time, taken from the family of curves generated on the basis of the manufacturer's load voltage over discharge time specifications, led to a direct comparison of the new values, as shown in Table 6, with the values presented in Table 5, for the first three instances introduced. All values of Table 6 were obtained by resistive measurements of power that entailed a negligible power loss. Table 6 confirms the fundamental equivalence of runs 1 through 3, as already seen from their corresponding analysis using the open voltage method (see runs 1 to 3, Table 5). This new power estimation method also confirms the lower loss encountered in run 2 utilizing interrupted PAGD operation. While the breakeven efficiencies sensibly doubled using this method, the estimates of actual electrical power consumption recovery decreased by a 2 to 3-fold factor. Thus this direct load voltage/amperage measurement method of estimating actual power losses or gains, is a check upon the open voltage method previously utilized.

Direct, instantaneous measurements of the voltage and current characteristics of the PAGD production and capture phenomena being discussed, were also performed during PAGD runs for diverse sets of conditions, including all those described in the two previous sections. In Table 7 we show these results for two PAGD generators having an identical electrode area (128 $cm^2$) and connected to electrical energy capture circuits of three separate configurations as set forth in FIGS. 10A, 10B and 10C and column 2, Table 7. In the configuration of FIG. 10C, or double diode configuration, both electrode plates act as cathodes and the axial member as the anode collector (experiments 1–4, for the H220 device and 13–14, Table 7, for the H34 device). In the configuration of FIG. 10B, or triode configuration, one plate acts as the cathode, the axial member as an auxiliary cathode and the other plate as a collector (experiments 5–9, Table 7). In the configuration of FIG. 10A or single (plate to plate) diode configuration, the axial member is disconnected, and the polarity of the plates remain as in the triode configuration (experiments 10–12). All measurements were taken after 1 minute of PAGD operation of the devices, which were, at the start of each run, at room temperature. All cathodes had been previously broken in with $>2*10^6$ AGD pulses. The open circuit voltage of the charge pack was, for all cases, at 359 to 365 volts, before each test. The direct measurements of the PAGD input and output DC voltages and currents were obtained as statistical means of 10 second long measurements, and at no time did the standard error of the plate voltage mean exceed 35 volts.

The air pressure within the tube during these tests is shown in column 3, Table 7, the drive pack DC voltage (X), in column 5, the DC voltage across the plates (Y), in column 6, the drive pack output current (PAGD input current), in column 7, and the drive pack total watts output is shown in column 8. Columns 9 and 10 show the PAGD voltage (PAGD V=(X-Y)/$I_{av}$) and the value of the PAGD extinction potential in V/cm. The recovery co-ordinates (ie the PAGD output energy) found at the U1–U2 output (FIG. 9), are shown in columns 11 to 13, as the charge pack's E1-E2 input DC voltage, amperage and power watts, respectively. The calculated resistance of the entire circuit is given in column 14, the registered PAGD frequencies in column 16, and running conditions in columns 17 to 18. The breakeven efficiency obtained by direct comparison of the electrical power figures for the drive and charge packs, respectively, is given in column 15. This assumes, for purposes of a generalization of power production rates over time, that the quasi-instantaneous, direct measurements here obtained can be translated to outputs obtained per unit time, and thus into direct Watt-hour measurements.

Data from runs 1 through 4 demonstrate that, at these PAGD frequencies, there is no difference between using fast switching (32 nanoseconds) MUR 860 diodes, or regular 40HFR-120 silicon diodes, in the rectification bridge of the electrical energy capture circuit, and that the PAGD frequency varies as a function of decreasing air pressure.

Runs 5 to 14 show that, in general, for the same tube, the single and double diode configurations are the most efficient, for the same pressure, the diode configuration typically yields ~1.5-2x larger breakeven efficiencies (cp runs 10–11 and 13–14, with runs 5–9, Table 7). The largest accumulations of power are also registered in the diode mode(s). This trend appears to be a function of the much lower cathodic work-function of the aluminum plates, than of the tungsten of the axial member utilized as an auxiliary cathode in the triode configuration. A feature of the data from these 14 different runs is the consistent excess power outputs (column 15, Table 7) and their narrower range (218 to 563%), when compared to those observed with the previous two methods of experimental analysis.

Run 12, Table 7, shows that the switching on of the electromechanical arm can be performed without entailing a power loss in the PAGD capture circuit, as previously found for run 5, Table 5, utilizing the open circuit voltage method. In fact, with C4=8 μF and R4=500 ohms, the AC induction motor behaves as an electrical flywheel (eg. 2800–3000 rpm for 10 PPS inputs), while the electrical energy capture circuit still registers a sizeable excess electrical power production (compare runs 11 and 12, Table 7). Runs 13 and 14 illustrate how the charge pack's state of charge and its inherent capacitance affects both the PAGD frequency and the power producing efficiency of the entire system: as the charge pack is reduced from 29 to 19 cells, the PAGD generator adjusts by reducing its frequency logarithmically and, while the charge pack input current is greater than before, the drive pack loss becomes still larger and the breakeven efficiency much lower (by $>\frac{1}{2}$, from 563% to 228%). This is because the circuit must translate the naturally larger PAGD amplitude into a larger surplus of output current, and in this process becomes less efficient.

If the first measurement method employed (the open circuit method) had to make too many theoretical assumptions about the system's performance under load conditions and hence about its effective charge capacity, the second approach still had to suppose an invariant discharge time and thus an invariant absolute charge capacity on the part of the battery systems (charge packs) employed for capture which it approximated by an operation of integral calculus. With the third method described above, theoretical assumptions were avoided except that, in these measurements, the actual performance of a given battery in terms of time, time of delivery and time of capture, was also ignored; no account is taken of the time-dependent modulation of the PAGD frequency, as effected by certain of the parameters analyzed, namely the charge pack state of charge, the method of sequencing the PAGD runs (continuous vs interrupted) and its concomitant heating effects, and the state of charge (load voltage and current capacity) of the drive pack. A simple, non-negligible, resistive measurement of power lost by the drive pack, and an identically non-negligible measurement of the power gained by the charge pack, for the same experiment and the same singular time of PAGD production, were performed repeatedly to corroborate the previous three approaches. For this purpose, all experiments were designed as a continuous series of sequential phases:

1) before a PAGD run, a resistive discharge was measured across either pack over periods of 1 to 3 hours (utilizing the DP and CP resistances previously reported in the open voltage section) and followed by a 15 to 30 minute open circuit voltage relaxation;

2) then, the PAGD runs were performed, either continuously or as interrupted, composite sequences, and the corresponding open circuit relaxation voltage(s) were measured, after the cessation of the integral PAGD run;

3) finally, resistive discharge measurements, obtained under identical conditions to those recorded before the PAGD run, were carried out for either pack, followed by concomitant battery voltage relaxation rate measurements.

Under these experimental conditions, exact power measurements could be taken from an analysis of the actual battery discharge curves before and after the PAGD run. Based on a comparison of the curve trends of the pre-run resistive discharge of the drive pack with those of the post-run resistive discharge, the effective power drawn ($\Delta E_c$) from the withdrawable power capacity of the drive pack incurred during a PAGD run, was ascertained. This represents the power consumption during the run, and the experimental value thus recorded constitutes the actual power figure that must be matched for breakeven ( ) to occur. Hence, the breakeven value equals, by definition, the electrical energy input to the system. Similarly, a comparison of the charge pack pre-run and post-run resistive discharge curve trends identified the effective power ($\Delta E_p$) added to the withdrawable capacity of the charge pack. This quantity represents the electrical energy recovered during the run. The relation for the two quantities is expressed by the breakeven efficiency (BE= %) equation:

$$\% = \Delta E_p / \Delta E_c * 100$$

If the breakeven efficiency is less than %=100, then the apparatus registers a net loss in electrical energy in the CP with respect to the DP. Conversely, if %>100, then there is a net gain in electrical energy in the CP, as compared to that lost in the DP. For purposes of this analysis, a limit to the minimum withdrawable capacity was placed, from experiment and in agreement with the load current curves of the manufacturer, at 115 W for the driver pack (average current of 0.250 A, minimum current of 0.230 A), and at 90 W for the charge pack (average current of 0.375 A, minimum current of 0.334 A), as a function of both their total cell size (respectively, 46:29) and the difference in the resistive loads employed for the discharge measurements. All cathodes had been broken in, as described before.

The results obtained with this fourth method, for six selected experiments with three diverse types of devices (using different electrode plate areas, gap lengths, and electrode work-functions), configured both in the triode or the (single) diode (e.g. FIG. 10B) arrangements, at the indicated pressures, are presented in Table 8. In all cases, a net excess of combined battery pack charge, expressed as electrical watt hours, is registered (columns 8 and 10, Table 8) and the breakeven efficiencies are all >100% (column 10). Experimental groups #1 and #2 again demonstrate that, for the same cathode, the interrupted PAGD sequence method of group #2 (1 minute of PAGD function, followed by a 15 minute relaxation, and so on) yields a higher breakeven efficiency because of the lower losses registered with this minimal plate heating method (column 10, Table 8). Group #3, Table 8, shows that the PAGD power production efficiency is also higher for a lower work-function cathode material (H220 vs H34), being subjected to PAGD auto-electronic conditions at a 4-fold lower pressure than the control groups #1 and #2; however, the lower pressure depresses the frequency and, together with the interrupted PAGD sequencing method, it also lowers the loss, causing an actually much larger breakeven value than registered for the previous two groups. Groups #4 and 5 exemplify the dual effect of lowering both the plate area and the gap distance: the former affects the PAGD event frequency, whereas the latter affects the PAGD amplitude, and thus the capture efficiency of the charge pack. Despite a cathodic work-function practically and operationally identical to that of groups #1 and 2, these smaller plate area and shorter gap devices utilized in groups #4 and 5, yield 3- to 6-fold lower net power outputs, as well as lower breakeven efficiencies, than the former groups, at the same pressure. Finally, group #6 exemplifies the results obtained for the plate diode configuration, where the frequency is lower (no triggering role for the axial member), and a higher loss leads to the lower breakeven efficiency, comparable to that of the lower area and shorter gap groups #4 and 5.

In order to verify the discharge curve lengths employed in these analyses and experimentally establish the actual charge capacity of the battery packs, calibration resistive discharges, between the maximum charge state and the minimum limits chosen, were performed for each pack with their respective discharge resistances R2 and R3 (see FIG. 9). These discharge calibration curves were plotted for half maximal charge values shown in FIGS. 15A and 15B, and from the curve produced, we have determined the total half-charge capacities of each battery pack to be 1.033 kWh (100%=2.066 kWh) for the drive pack and 660 Wh (100%=1.320 kWh) for the charge pack. Based upon the corresponding maximal (100%) capacity values, we determined the actual percentages of the relative charge capacities shown in column 5, Table 8, which correspond to the experimental values obtained. We also noted that the curves plotted showed two quite distinct time linear slopes, the slope of the delivery of power per time unit steepening very markedly at the approach to the limits of the permissible withdrawable capacity, occurring at 115 W into R2, and 90 W into R3.

The pre-PAGD run and post-PAGD run, drive and charge pack discharge curves corresponding to groups #3 and #6, respectively for triode and plate diode configurations, in Table 8, are shown in FIG. 16 (drive pack) and 17 (charge pack), for group #3, and in FIG. 18 (drive pack) and 19 (charge pack), for group #6. In all cases, the open symbols represent the pre-PAGD run discharge curves, whereas the closed symbols represent the post-PAGD run discharge curves.

As a further check on these values, a videographic, millisecond analysis of the singular power simultaneities occurring at both ends of the system (drive and charge packs) was performed for various 10 second samples of diverse PAGD runs. A typical example is shown in FIG. 20, which is a sample of the PAGD run designated as #6 in Table 8. Whereas the drive pack DC wattage spent as input to PAGD production varied from 36.6 to 57.82 watts, by a factor of 1.6x, the DC wattage entering the charge pack as captured PAGD output varied more pronouncedly by a factor of 2.7x, from 146.4 to 399.6 watts (all meters were in the same selected ranges of voltage and current) with the semi-periodic, intermittent character of each singular emission, though within specific, ascertainable ranges for both amplitude and current outputs. Assimilation of the singular behaviour of the PAGD in this sample, by a statistical treatment of its variation (n=64), indicates that the operational breakeven efficiency observed during this sampled period lies at 485.2%±18% with projected 48.3Wh drive pack loss and 221.7Wh charge pack gain. This matches rather closely the observed 483% breakeven efficiency, and the 37.7Wh loss as well as the 182.2 kWh gain for the overall PAGD run reported in group#6, Table 8, and indicates how close are the values obtained by the operational and extensive non-negligible resistive discharge power measurement methods employed.

Finally, an example of the correlation between the drive pack PAGD load voltage and the charge pack PAGD charging voltage, as a function of the duration of the intervening PAGD run between resistive discharge measurements, is shown in FIG. 21, for the PAGD run corresponding to group #4, Table 8.

Using the same pulse generator with H200 AL 128 $cm^2$ plates, in a double diode configuration, and the same circuit values (but with CP=23 cells), three experiments were conducted at different PAGD frequencies, as a function of varying air pressure. Analysis of driver pack losses and charge pack gains by the extensive load discharge measurement method, as described before, led to the determination of the gross and net gains (respectively, without and with losses included) per pulse, in milliwatt-hour, for each frequency, as well as of the gross and net power gains per second of PAGD operation. The results are shown in Table 9. Even though the gross and net gains of power per pulse were observed to increase with decreasing frequency, the gross power gain per unit time increased with increasing frequency. However, this last trend does not necessarily translate into a higher net gain per unit time, because the losses in the driver pack (not shown) also increase significantly with PAGD frequency. These losses are in all probability related to more energy retention by the plasma at higher frequencies when plasma extinction becomes incomplete. We expect net gains to reach optimal thresholds for any given type of circuit configuration set of values and pulse generator dimensions.

Certain additional observations made during experiments with the double diode configuration of FIG. 10A may assist in understanding of the invention.

1) Replacing residual air with argon gas leads to higher PAGD frequencies, as noted by us when utilizing a 128 cm$^2$ H200 AC plate pulse generator in the double diode configuration (V=575). At 1 Torr, the pulsation rate went from 20 PPS in air to 1300-400 PPS in argon. With 29*12 v cells in the charge pack, input currents ceased to flow into it. Under these conditions, the tube potential across the plates decreased and the drop across the input resistor increased. The value of $E(=V/d)$ became smaller (gap size=3 cm from plate to axial anode collector), as the extinction voltage decreased.

2) With frequencies of 400 PPS, the currents flowing into the charge pack fell to zero. Replacing a fast-recovery type HFR 120 (1200v, 40A) diode bridge by a type MUR 860 (600v, 8A) diode bridge had no effect. When the amplitude of plate potential oscillations falls below the potential of the charge pack, there is also a tendency to produce arc discharges. For output currents from the vacuum pulse generator to enter the charge pack, the number of cells must be reduced so that the potential of the charge pack is low enough to admit the transduced currents. A reduction from 29 to 23 cells allowed currents of 250 mA to enter the CP, and further reduction to 19 cells doubled these currents (per polarity arm).

3) Our observations show that it suffices under these conditions (CP=19 cells) to increase the vacuum, so that the frequency decreases, and the plate potential and the charge pack input currents increase. At 0.1 Torr, the currents reached 1A D.C. per plate, and at 0.05 Torr, 2A D.C.

The interconnection between these factors indicates that the extinction voltage is a function of the PAGD frequency: the higher the PAGD frequency, the lower the extinction voltage, until empirical (in distinction from predicted) VAD field values are reached. As a consequence, the start voltage of the charge pack must be adjusted, by varying the number of cells composing it, so that it lies below the lowest extinction voltage of the PAGD, for any given geometry and gap distance.

Secondly, as the ion plasma is made more rarefied, the frequency of the emissions decreases, but the peak values of the output voltage and current per pulse increase. The slower the PAGD and the more rarefied the atmosphere, the higher is the output energy produced by the system relative to the input energy.

Autographic analysis of PAGD-induced cathode craters in H34 plates was performed, and their average inner diameter and maximal depth were determined. Similar studies were performed for PAGD-induced craters in Alzak (trade mark) plates. The secondary craters characteristically found in Alzak plates, along fracture lines irradiating from the main crater, are absent in H34 plates; instead, in H34 plates, one observes a roughened surface surrounding the emission crater, quite distinct from the original rough aspect of the pulled finish of these hardened aluminum plates. Also unlike the Alzak main craters, the H34 craters often have a convex center occupied by a cooled molten metal droplet, whereas the Alzak craters had a concave, hollowed out aspect. Eventually, as the pitting resulting from PAGD cathodic emissions covers the entire cathode, the metallic surface gains a very different rough aspect from its original appearance. In this process, craters from earlier metal layers become progressively covered and eroded by subsequent emissions from the same cathode. Altogether different is the surface deposition process occurring at the anode; here, the surface appears to become more uniform, through the mirroring and possibly abrasive actions of cathode jets. Macroscopically, with increased periods of PAGD operation, the anode surface appears cleaner and more polished.

With the data obtained by the metallographic method of crater measurement, we estimated the volume of metal ejected from the cathode, by assuming that the crater represents a concavity analogous to a spherical segment having a single base $(1/6\pi*H[3r^2+H^2]$, where H is the height of the spherical segment and r the radius of the sphere), while disregarding the volume of the central droplet leftover from the emission. The following are mean ±SEM crater diameters (D), crater depths (H) and maximum volumes (V) of extruded metallic material for two types of aluminum cathodes, Alzak and H34 hardened aluminum, subject to a high input current PAGD:

1- Alzak: D—0.028 cm±0.003; H—0.002 cm±0.0002; V—6.2*10$^{-7}$ cm$^3$;

2- H34: D—0.0115 cm±0.0004; H—0.0006±0.0001; V—3.1*10$^{-8}$ cm$^3$;

Accordingly, utilizing plates composed of either material with 3 mm of thickness, and thus with a volume of 38.4 cm$^3$ per plate and considering that only ⅔rds of the cathode shall be used (a 2 mm layer out of the 3 mm thickness), the total number of pulses per plate total (TLT) and partial (PLT) lifetimes is theoretically:

1- Alzak: TLT: 6.2*10$^7$ pulses; PLT: 4.1*10$^7$ pulses;

2- H34: TLT: 1.2*10$^9$ pulses; PLT: 8.1*10$^8$ pulses.

Typically, an H34 device can produce ~0.25 kWh per 10,000 pulses. The corresponding value for a PLT is thus a minimum of 1.0 MWh/Alzak cathode and of 20 MWh/H34 cathode. As the cathode for each combination is only 66.7% consumed, the vacuum pulse generator may continue to be used in a reverse configuration, by utilizing the other plate in turn as the cathode; thus, the estimated minimal values become, respectively, 2.0 MWh/Alzak pulse generator and 40 MWh/H34 pulse generator. The same rationale applies for the double diode configuration of FIG. 10C.

We have created a two-ported system for the production of the singular discharge events which we have previously identified in the '863 application as an endogenous pulsatory abnormal glow discharge regime where the plasma discharge is triggered by spontaneous electronic emissions from the cathode. We have examined the functioning of this two-ported system in order to determine what were the electrical power input and output characteristics of a sustained PAGD regime. Despite the wide (10-fold) variations in net power and breakeven efficiencies measured by the four different methods employed (open voltage measurements, time integration of negligible power measurements, operational power measurements and real time non-negligible power measurements), all methods indicate the presence of an anomalous electrical transduction phenomenon within the vacuum pulse generator, such as can result in the production at the output port of electrical energy measured and directly captured which is greater than would be anticipated having regard to the electrical energy input at the input port. With the most accurate of the methods employed we have found typical PAGD power production rates of 200 Wh/hour of PAGD operation, and these may reach >0.5 kWh/h values.

The discrepancies between the methods utilized have been extensively examined in the preceding section.

Our systematic approach demonstrates that the most frequently employed method of measuring the charge capacity of batteries by the open voltage values is the least reliable approach for the determination of the actual net power lost or gained by the battery packs used in the system: when compared to all three other methods, it overestimates net power consumed and produced by up to 10 fold, as well as distorting the breakeven efficiencies, particularly at the extremes of operation. All this results from the grossly diminished (50-60% of manufacturer's theoretical estimate) effective charge capacity of the lead acid gel cells employed, as determined experimentally from FIGS. 18 and 19, when compared to the theoretical maximal charge capacity values that serve as scale for the open voltage measurements. In other words, the effective energy density of the batteries during these experiments was in fact approximately half of the manufacturer's estimated 30 Wh/kg.

Under these actual conditions of battery performance, the third and fourth methods (respectively, operational and real-time non-negligible power measurements) of power consumption and production proved to be the best approach to measure both PAGD electrical power input and output, as the results of both methods matched each other closely, even though the former is a statistical treatment of simultaneous events and the latter is a real time integration of their cumulative effects. The second method is clearly less reliable than either the third or the fourth methods, and this stems from the fact that the power consumption slopes of negligible resistive discharges not only are very different from the quasi-steady state discharge slopes (beginning at >5-15 minutes) of extensive resistive discharges, but also their proportionality may not reflect the real time proportionality of equivalent prolonged resistive discharges.

The main advantage of the fourth method is that it effectively takes into account the actual time performance of the batteries comprised by the overall PAGD production and capture system we have described. As such, the method may have the main disadvantage of reflecting more the limitations of the batteries employed (their high rate of degradation of the absolute value of total effective charge capacity, and limited efficiency in retaining charge derived from discontinuous input pulses) than indicating the actual power output. There are a number of possibilities for fine tuning of the system introduced by the present work, beginning with the utilization of secondary batteries or other charge shortage or absorption devices that have less variable or more easily predictable actual charge capacity. In this respect, there are two major shortcomings to the batteries used to form the drive and charge packs; (1) their significant memory effect and (2) their design for constant, rather than discontinuous, DC charging. Recently developed Nickel Hydride batteries are an example of an electrostatic charge-storage system that lacks a substantial charge memory effect, and their experimental batteries are being developed currently for higher efficiency intermittent charging methods. Electrostatic charge retention systems having better energy densities, better charge retentivities and insignificant memory effects will probably be more efficient at capturing and holding the energy output by the circuit. In practical embodiments of the invention, effectiveness in charge utilization will be more important than measurability, and any device that will use the energy effectively whilst presenting an appropriate back EMF to the system may be utilized.

The effect of the performance characteristics of the drive and charge packs is only one amongst many parameters affecting operation of the invention. As shown by our extensive investigation of the diverse PAGD phenomenon the recovery of energy from it by electromechanical transduction as in the '531 application, or electrostatic capture as described above, the factors involved in modulating the frequency, amplitude and peak current characteristics of the PAGD regime are complex. Manipulation of these factors can improve electrical energy recovery, or reduce it or even suppress PAGD. We have so far noted numerous factors that affect PAGD frequency and some amongst those that also affect the PAGD amplitude. Aside from these factors, the circuit parameters of the output port portion of the circuit, in addition to the nature and chemical characteristics of the battery cells already discussed, the charge potential of the charge pack, the characteristics of the rectifiers in the recovery bridge in relation to the period of PAGD superesonant frequencies, and the effective values of the parallel and transversal capacitance bridges can all influence the results achieved. Certain factors however have a radical effect on PAGD operation, such as the gap distance and the charge pack potential. Too small a gap distance between the cold emitter (cathode) and the collector will result in an increasing reduction in energy recovery. The potential presented by the charge pack must be less than the voltage amplitude developed by the PAGD, as specified by a given gap distance at a given pressure. Too large a charge pack size with respect to PAGD amplitude and the gap length will preclude PAGD production or result in extremely low PAGD frequencies. In brief, the energy absorption rate and the counter potential presented by the charge pack or other energy utilization device are important factors in the operation of the circuit as a whole, and should either be maintained reasonably constant, or changes should be compensated by changes in other operating parameters (as is typical of most power supply circuits).

Since our test results indicate that the electrical power output of the circuit can be greater than the electrical power input to the circuit, the circuit clearly draws on a further source of energy input. Whilst we do not wish to be confined to any particulary theory of operation, the following discussion may be helpful in explaining our observations. These observations have been discussed in some detail so that the phenomenon observed can be reproduced, even if the principles involved are not fully understood.

In the '863 and '531 applications we have identified a novel, cold-cathode regime of vacuum electrical discharge, which we have termed the pulsed abnormal glow discharge (PAGD) regime. This regime, which occupies the abnormal glow discharge region of the volt-ampere curve of suitable discharge tubes, has the singular property of spontaneously pulsing the abnormal glow discharge in a fashion which is endogenous to the tube and its circuit environment that constitutes a vacuum pulse generator device, when it is operated under the conditions we have identified. In fact, when stimulated with continuous direct current, in such conditions, such a circuit responds with spontaneous abnormal glow discharge pulses that enable effective segregation of input and output currents. We have demonstrated electrically, metallographically, oscillographically and videographically, how the pulsed discontinuity results from a self-limiting, autoelectronic cathode emission that results in repeated plasma eruptions from the cathode under conditions of cathode saturated current input. The auto-electronic triggering of the PAGD regime is thus akin to that of the high-field emission mechanism thought to be responsible for vacuum arc discharges (VAD regime). However, under the PAGD conditions we have defined, this mechanism is found to operate in the pre-VAD region at very low field and low input average direct current values, with very large interelectrode distances and in a self-limiting, repetitive fashion. In other words, the PAGD regime we have identified has mixed characteristics: its current versus potential (abnormal glow) discharge curve is not only distinct from that of a vacuum arc discharge, but the electrical cycle of the PAGD regime itself oscillates back and forth within the potential and current limits of the abnormal glow discharge region, as a function of the alternate plasma generation and collapse introduced by the discontinuous sequencing of the auto-electronic emission process. Accordingly, the intermittent presence of the abnormal glow, as well as the observed segregation of the current flows, are due to the diachronic operation of these spontaneous cathode emission foci. The micro-crater and videographic analyses of the PAGD have demonstrated the presence of an emission jet at the origin of each pulse, a phenomenon which VAD theory and experiment has also identified. Metallic jets originating at the cathode spots of VADs have been known to present velocities up to, and greater than 1000 m/sec.

In light of the above, the energy graft phenomenon we have isolated would have to be operated, at the micro-event scale, by the interactions of the cathode emission jet with the vortex-formed impulse-transducing plasma in the interelectrode space. Several aspects can be approached in terms of the complex series of events that constitute a complete cycle of operation, on a micro-scale. There are interactions within the cathode, interactions at the cathode surface, interactions between the emission jet and the plasma globule close to the cathode, and finally, interactions of the resulting electron and ion distributions in the interelectrode plasma, within parallel boundaries.

In general, in the presence of an electrical field, the distribution of potential near the cathode forms a potential barrier to the flow of electronic charge, as this barrier is defined by the energy that the most energetic electrons within the metal, the Fermi energy electrons, must acquire before freeing themselves from the cathode surface potential to originate an emission jet. Before any free electrons become available for conduction in the space adjoining the cathode, they must cross the boundary posed by the potential barrier. With a weak applied field, classical electron emission from a metal can only occur if an energy practically equal to the work-function of the metal is imparted in addition to the Fermi energy. Under thermionic conditions of emission, the heating of the cathode provides the needed energy input. However, the cold-cathode Fowler-Nordheim quantum-field emission theory predicted the existence of a finite probability for an electron to tunnel through the potential barrier, when the applied field is high. Cold-cathode electron emissions are thus possible, under these conditions, at practically Fermi energy levels, as the high field would catalyze the tunnelling through the potential barrier by narrowing the barrier width for the Fermi energy electrons. The exact localization of the emission would then depend on the randomized fluctuations of high fields at the cathode, which were produced by positive space charges sweeping in proximity to it. For most purposes, this theory has been the working hypothesis of the last 60 years of field emission studies, which have centered upon the VAD mechanism, despite the fact that observed field gradients are evidently inadequate to explain breakdown as a function of the theoretical high field mechanism. The Fowler-Nordheim theory has therefore suffered major revisions and additions, mostly to account for the fact that it postulates, as a condition for cold-cathode field emission in large area electrodes, the presence of enormous fields ($>10^9$ V/m) and extremely low work functions, neither of which are borne out by experimental VAD investigations. Some researchers have found that the breakdown responsible for the VAD field emission is promoted by Joule heating and vaporization of microscopic emitter tips, and that this requires a critical current density ($10^{12}$ A/cm$^2$), while others emphasized that this explanation and these thresholds did not hold for large area emitters and that a space charge effect of concentrating the ion distribution near the cathode promoted breakdown under these circumstances, when the field reached a critical value; large field enhancement factors ($>1000$-fold) have been postulated to explain the discrepancy between theoretical predictions and experimental findings regarding the critical breakdown field values, and others have demonstrated how this critical field value effectively varies with work-function and electrode conditioning.

The PAGD regime and its self-extinguishing auto-electronic emission mechanism stands as an exception to the high field emission theory as it currently stands with all its modifications, especially given that in this phenomenon we are confronted.. with a cathode emission that spontaneously occurs across the large gaps in large plate area pulse generators, at very low field values (down to $<1*10^4$ V/m), as shown above and in the '863 application. Moreover, a Fowler-Nordheim plot (in the form $\text{Log}_{10}$ (I/V$^2$) vs 1/V) of the PAGD volt-ampere characteristic exhibits a positive slope, rather than the Fowler-Nordheim negative slope characteristic of VAD field emission. However, current density values obtained from correlations of autographic analysis of the cathode with an analysis of event-oscillogram (peak pulse currents), indicate that the PAGD current density J may reach values of $10^5$ to $10^7$ A/m$^2$ during the emission process (the larger Alzak craters have an associated lower J value), values which, at the upper end, do not reach the $10^9$ A/m$^2$ current density threshold required by the Fowler-Nordheim theory. Considering these two distinct observations with regards to field strength and current density, we have to admit the existence of a low field, large area cold-cathode auto-electronic emission endowed with high current densities, which is not predicted by current field emission theory.

Unlike the typical VAD regime, the PAGD is neither a high frequency oscillation, nor does it occur in a random fashion. It constitutes a semi-regular, quasi-coherent, periodic energy transduction which cycles between cathode drop limits that are higher by a factor of 2–15 than typical vacuum arc cathode drops. The intermittent cathode emission responsible for the low frequency, pulsed behaviour of the abnormal glow, is also self extinguishing and self-starting, under the conditions we have defined. Furthermore, we have also identified a novel and unexpected dependency of the periodic pulse rate upon the cathode area. This indicates the presence of field emission control parameters heretofore unsuspected. It is likely that field fluctuations of the polarized pre-breakdown field is responsible for eliciting the particular localizations of the auto-electronic emission foci, as well as what imparts, in a lens-like fashion, the distorted field energy needed for electron surface release. In this sense, external, electrical or magnetic field fluctuations (e.g. motion of static charges or of constant magnetic fields) induced by us at pre-breakdown potentials, provoked PAGD emissions and breakdown at these levels.

In general, VAD studies have shown that, for large area electrodes, microgeometry, adsorbed gas layers and gas impurity contents of the cathode play a role in modulating field emission. In our PAGD studies, the interactions at the cathode surface and across the cathode potential drop are clearly modulated by: (1) the nature of residual gases, as shown by our air vs Argon studies; (2) their pressure, (3) electrode conditioning, (4) work-function and (5) cumulative pulse count, amongst others.

The plasma, in leak-controlled or low pressure PAGD devices, has both residual gas and metallic vapor substrates. In devices initially closed at high to very high vacua (diffusion pump pressures), the major residual substrate, whose presence increases with time of operation, is the metallic vapor released from the cathode and not impacted onto the envelope walls or the anode. It has been previously shown for externally (magnetically or electrostatically) pulsed plasma accelerators, that the amount of residual gas or vapor left in the interelectrode space diminishes with increasing number of consecutive discharges and a growing amount of electrode-insulator absorption of gas. The effect of such removal of residual gas or vapor is to decrease the vacuum of a sealed envelope. With high vacuum sealed PAGD generators we have observed that prolonged operation and sputter-induced mirroring of the envelope causes a progressive disappearance of the discharge, as the voltage potential needed to trigger it also increases. At the thermocouple, low frequency pulsed abnormal glow discharges can also be seen to increase the vacuum significantly. These results suggest instead the presence of a pumping mechanism in the PAGD which is somewhat analogous to that of sputter ion pumps, where collision of ionized gas molecules with the cathode is responsible for the sputtering of cathode material that either combines with the gas substrate ('gettering' action) or 'plasters over' the inert gas molecules onto the anode (a process known as 'ion burial'). These are the two basic pressure reducing actions of sputtered getter atoms, in ion pumps. However, in ion sputter pumps, the initiation of the cycle is a function of the presence of high velocity electrons in the high field plasma of the glow discharge, which are necessary to ionize the gas substrate molecules; also, the getter material typically has a high work-function for field emission. Hence, the sputtering is due to the secondary impact of plasma positive ions at the cathode, after plasma ionization has occurred in the interelectrode space. Altogether different is the mechanism of spontaneous, primary electron emission from the cathode, which is characteristic of the low field PAGD: here, the sputtering is caused by the electronic emission itself and attendant metallic vaporization processes. By artificially confining the firing foci to a part of the cathode, we have shown in the single diode configuration how the PAGD induced sputtering is associated with the cathode autoelectronic emission mechanism, rather than with the abnormal cathode glow per se, given the localization of sputtering onto the emission region of the plate, despite its overall cathode glow saturation.

These observations would thus seem to corroborate the hypothesis of a progressive vacuum increase with the cumulative number of emitted pulses, were it not for the fact that experiments performed with leak controlled devices (reported here and in previous studies) show that, when the negative pressure is maintained by balanced leak admission of air or argon, pulse rates still decrease with cumulative pulse count, and do so neither as a function of an increase in vacuum, nor as a function of envelope mirroring (unless this is so extensive as to establish envelope conduction), but rather as a function of processes (generally referred to as conditioning) inherent to the electrodes, specifically, to the cathode. We have further shown that, for such altered emitter states, the pressure of the vessel must be increased, not because of an increasing vacuum (precluded by the controlled gas leak), but because of the effect that residual gases may have in modulating the low field PAGD emission.

PAGD electrode conditioning is a cathode-dominant process resulting from the cumulative emission of high numbers of pulses by a cathode, and has been shown to be a factor independent of the nature and pressure of the residual gas and partially reversible only by operation with reversed plate polarity, unlike reports of copper cathode-dominant conditioning. It is thought that electrode conditioning and the accompanying increase in VAD breakdown potential are due to the progressive adsorption of residual gases, though cathode-dominant conditioning processes, such as subjecting the vacuum gap to consecutive discharges, have been shown to correlate the decrease in plasma impulse strength with electrode outgassing of absorbed or adsorbed gases. Moreover, given the pitting action of crater formation at the cathode by the PAGD regime, and, as we shall see below, the metallic plating of the anode, the PAGD cathode-dominant process of conditioning we have observed with respect to decreased pulse frequency and increase in potential, suggests that the apparent increase in cathode work function is not due to gas adsorption or absorption. These processes are more likely to occur on the plated anode. It is likely that, given the observed PAGD pressure reducing effect caused by the cathodic jet, a certain outgassing of the cathode is in fact occurring during PAGD function. One might also expect that the anode, if plated by sputtering atoms, would increase its gas content in the formed surface film. However, controlled leak experiments suggest instead that some other type of alteration of the cathode work function is occurring, which is, as we shall examine below, independent of the adsorbed gas state of the electrodes, as well as independent of the PAGD ion pump-like effect. Nonetheless, even at the level of the anode, the PAGD sputtering action may have contradictory effects: it may impact interelectrode gap molecules onto the collector, as well as release, by ionic bombardment and vaporization, gases adsorbed to, or contaminating the anode. If we assume that gas adsorption by impact on the collector is the predominant mechanism, one could explain the increase in the number of breakdown sites per unit time, as observed by us for a re-reversed cathode, if the number of PAGD breakdown sites depended on the quantity of adsorbed gases, eg oxygen, on the cathode being tested. Recovery of the cathode work-function would depend on the electronic charge recovery of the positively charged, adsorbed or occluded gas layer at the cathode- either by reversal or as a function of time of inactivity. The surface film theory of 'electrical double layer formation at the cathode' in fact contended that, low field flash over is a photocathodic effect dependent upon the presence of a glowingly positively polarized gaseous film at the cathode; this film would lower the cathode emissivity by decreasing the field between the cathode surface and the leading edge of the cathode glow, across the cathode drop. However, even though the surface film theory of 'electrical double layer formation at the cathode' predicts the lowering of the emission breakdown potential and the increase in flash over rate when the electrodes are reversed—as the anode would have acquired a surface charge capable of affecting the breakdown potential, it acknowledges nevertheless, that the anodic surface charge hardly explains the observed intensity of the polarization effects. Moreover non-reversed, conditioned cathodes retained their lower PAGD frequencies in a time independent manner, for as long as reversal was avoided (excluding a PAGD frequency recovery effect due to plate cooling, which may be as short as 15 minutes). PAGD conditioning was independent of idle time and increased with cumulative pulse count. Moreover, the AGD pulses are not UV photocathodic Townsend discharges, liberating secondary electrons via positive ion impact at the cathode. Nor could photocathodic emissions generate currents of the magnitude observed in the PAGD. Lastly, the PAGD discharge and breakdown thresholds appear to be unaffected by UV, though they may be somewhat depressed by visible light, and the emission mechanism in the PAGD is the primary process.

Removal or flattening of protuberances and tips from the emitting cathode by the action of the discharge, is a process also thought to play a role in hardening the cathode or increasing its field emission work-function. However, this explanation may not be adequate for the PAGD emission process, if we consider our metallographic findings of a smoothing action of the discharge at the collector. In fact, it would appear that the flattened, smoother, plated, mirrored and cleaner surfaces subjected to PAGD bombardment are the explanation for the observed increased emission ability of re-reversed cathodes: mirrored Alzak surfaces emit at higher frequencies than do dull H34 and H220 surfaces; new, polished surfaces emit at a higher frequency than do pitted, broken in surfaces; anode surfaces, never before utilized as cathodes but subjected to prolonged PAGD action, emit at higher frequencies when employed as cathodes, than do new, identical cathode surfaces; and ex-cathodes, employed for prolonged periods as anodes, regain a higher emission frequency upon re-use as cathodes. The better PAGD emission performance of smoother cathodes, compared with the worse VAD emission performance of the same, when pitted cathodes (lacking protuberances) are used, requires explanation.

Rakhovsky has put forth a VAD model for cathode spots, that distinguishes between Type I spots (quickly moving spots, far from steady state and responsible for crater formation), and Type II spots (quasi-stationary and near steady-state, but leaving an itinerant track with no sign of crater formation). Whereas the former would obey the Fowler-Nordheim requirement for high fields ($>10^9$ V/m), the latter could hardly be expected to do so with typical arc voltage drops in the order of 10 V. Once again, autographic analysis of the PAGD emission aspect indicates mixed characteristics: the PAGD cathode spot is a hybrid. It behaves as an intermittent instability that leaves single (e.g. in H34) or clustered (e.g. in Alzak) craters, which are both qualities of Type I cathode spots; and it exists under low field conditions ($<10^5$ V/m), with cathode drops of 20 to 150 V, in a quasi-coherent mode, leaving an itinerant track of successive craters when operating at the higher frequencies, all of which are properties approaching those of a VAD Type II cathode spot. Furthermore, the macroscopically visible metal sputtering (due to the explosive action of the PAGD emission phenomenon) occurring at the upper end of the permissible DC current input scale, and the presence of large solidified molten metal droplets in and around the craters, suggest models which have been proposed for explosive electronic emission. Explosion models propose that the creation of a residual plasma ball in front of a microprotuberance provokes the large potential drop at the prospective emission focus and sufficiently high resistive and Nottingham heating to reach $>10^7$ A/cm$^2$ current densities during the explosive consumption of these microemitters. Whether the explosive action associated with cathode spots is an auxiliary effect that applies solely to the vaporization of the emitting microprotrusion, or an integral emission and vaporization explosive process, it does not appear that it can be restricted to high-field VAD Type II cathode spots, given that it can be equally made to occur with the low field PAGD hybrid cathode spot, and be macroscopically observed. Indeed, in the plate diode configuration, it is easy to visualize the metallic particle explosions that surround and accompany the plasma jets, near to upper current limit conditions. However, if we are to assume that any of these models apply to the emission mechanism, we would, in all likelihood, have to conclude that the PAGD initial emission sites must be submicroscopic (100 to 10 nm), rather than microscopic. Resolution limits to our own metallographic examination of the smoothing action of the PAGD discharge on the collector would thus have precluded us from detecting formation of such submicroscopic protrusions, as well as their presence in a 'soft' cathode- and thus infer their disappearance from a pitted, hardened cathode; but if the disappearance of such submicroprotuberances were responsible for the observed alteration of cathode work function, one would also thereby have to postulate the existence of a mechanism for microroughness regeneration (eg. tip growth) at the anode, in order to explain the observed increased emission upon cathode re-reversal. Furthermore, this regeneration would have to be actively promoted by operation with reversed polarity, and this is problematic. Focusing of the distorted or magnified field upon alumina inclusions on pure iron electrodes has been demonstrated to degrade breakdown voltage for field emission, but the effect was greater for larger microscopic particles. If we were to apply this concept to our work, it would require the existence of unmistakably abundant microscopic heterogeneities in the quasi-homogeneous electrode surfaces employed, which we did not observe; on the contrary, their absence suggests that either the microroughness responsible for the low field PAGD emission is submicroscopic, or that the field distortion responsible for eliciting the PAGD is independent of the presence of these protuberances. This last possibility must be taken all the more seriously, in light of the fact that PAGD functioning is able to cover with craters the entire surface of an emitter.

Whereas the discharge potentials observed in the PAGD have been shown to be relatively independent of the kind of gas present, there is a gas effect in the PAGD phenomenon, particularly in what concerns its frequency, observed when the same 'run down' cathode was capable of much higher emission rates when exposed to argon, than to air. Utilizing the technique of bias sputtering, it has been demonstrated that the number of charge symmetric collisions (dependent upon sheath thickness d and the ion mean free path) in the plasma sheath, which are responsible for lower energy secondary peaks in ion energy distribution N(E), at pressures of 0.2 Torr, is substantially greater in argon than in argon-nitrogen mixtures, and thus that, under these conditions, mostly $Ar^+$ and $Ar^{++}$ ions impact the negatively biased electrode. In non-equilibrium RF discharges, greater ion densities have also been attained with argon, than with air. With respect to field emissions, one would expect a gas effect only with regards to changes on surface conditions, though such studies have shown contradictory effects of argon upon cathode work function. In light of the foregoing, and given that the PAGD is an emission discharge and not a sputtering discharge per se, in the strict sense, we can conceive of the role of inert gas atoms in increasing, as compared to air or nitrogen, the ion energy density distribution at the PAGD cathode spot interface with the cathode surface emitter, and thus elicit increased emission rates from the cathode, by pulling electrons from the metal via the field effect. While this is consistent with the concept of focused distortions of space-charge field fluctuations inducing localization of the emission foci, the argon effect can be observed in the PAGD regime over the entire range of the Paschen low vacuum curve, and into Cooke's mid to high vacuum curve, at low fields and without negative biasing. Thus, it is not simply a high pressure (nor a gas conditioning) effect, even if the gas effect in question applies to the description of a local pressure rise at the emission site/-cathode spot interface, which may play a role in enhancing the local field.

Considered together, the PAGD emission-derived sputtering, the observed metallic plating of the anode and the explosive aspect of the discharge, suggest the presence of a jet of metallic vapor present in the discharge and running, contrary to the normal flow of positive ions, from the cathode to the anode. This jet appears to have properties similar to the high speed vapor ejected from the cathode in a VAD, as first detected by Tanberg with his field emission pendulum (Tanberg, R. (1930), "On the cathode of an arc drawn in vacuum", Phys. Rev., 35:1080) In fact, the VAD high field emission process is known to release, from the cathode spot, neutral atoms with energies much greater than the thermal energy of the emission discharge. This anomalous phenomenon brings into play the role of the reported cathode reaction forces detected in vacuum arc discharges (Tanberg, as above, also Kobel, E. (1930), "Pressure and high vapour jets at the cathodes of a mercury vacuum arc", Phys. Rev., 36:1636), which were thought to be due to the counterflow of neutral metallic atoms, from the cathode onto the anode (charged metallic ions are normally expected to target the cathode). In absolute units of current, this current quadrature phenomenon has been shown to reach, in the VAD regime, proportions of the order of $100*I^2$ (see also the Aspden papers referenced below). Early interpretations attributed this to the cathode rebounding of <2% of gas substrate-derived plasma positive ions hitting the cathode and being charge neutralized in the process, but having kept most of their thermal energy. Tanberg held instead that the counterflow of neutral particles responsible for the cathode reaction force was cathode derived, effectively, that it constituted a longitudinal interaction acting in the direction of the metallic arc jet. However, even though secondary high energy distributions of neutral atoms emanating from the cathode do not have thermal energies, their modal distribution does (Davis, W. D. and Miller, H. C. (1969) J. Appl. Phys., 40:2212) furthermore, the major anomalous atomic counterflow that accompanies the high energy electron flow toward the anode, was shown mass spectrographically to consist predominantly of multiply ionized, positively charged ions of cathode metal, rather than neutral atoms. If this made it easier to abandon the primacy of the rebounding model, it was now more difficult for field emission theorists to accept and explain the observed high energies (ion voltages in excess of the discharge voltage drops) and the high ionization multiplicity associated with these counterflowing positive ions. This field of investigation has indeed been one of the mounting sources of evidence suggesting that there is something amiss in the present laws of electrodynamics. The anomalous acceleration of counterflowing ions, and the energy transfer mechanisms between high speed or 'relativistic' electrons and ions in a plasma (Sethion, J. D. et al, "Anomalous Electron-Ion Energy Transfer in a Relativistic-Electron-Beam-Heated Plasma" Phys. Rev. Letters, Vol. 40, No. 7, pages 451–454), in these and other experiments, has been brilliantly addressed by the theory of the British physicist and mathematician, H. Aspden, who first proposed a novel formulation of the general law of electrodynamics capable of accounting for the effect of the mass ratio factor ($M/m'$) in the parallel (and reverse) motion of charges with different masses, (Aspden, H. (1969) "The law of electrodynamics", J. Franklin Inst., 287:179; Aspden, H (1980) "Physics Unified", Sabberton Publications, Southampton, England). The anomalous forces acting on the counterflowing metallic ions would stem from their out of balance interaction with the emitted high speed electrons, as predicated by the electrodynamic importance of their mass differential. This results in a fundamental asymmetry of the plasma flow between electrodes, localized onto the discontinuous interfaces of the plasma with the electrodes, namely, in the cathode dark space and in the anodic sheath: on the cathode side, electrons act upon ions, as the emitted electrons having less than zero initial velocities, drift against the incoming ion flux and in parallel with the ion and neutral counterflows; on the anode side of the discharge, positive ions flowing toward the cathode confront mainly the incoming counterflow of positive ions and neutral atoms, as the high speed electrons have abnormally transferred their energy to counterflowing, high speed, cathodic metal ions. An out of balance reaction force thus results at the cathode, to which the leaving metallic atoms impart a force of equal momentum but opposite direction, a force which is added to the cathode momentum generated by impacting, normal flowing positive ions. Moreover, Aspden confirmed theoretically the fundamental contention of Tanberg's experimental findings that an electrodynamic force will manifest itself along the direction of the discharge current flow, and thus, that the atomic counterflow is a metallic jet. Aspden further demonstrated that this asymmetry of plasma discharges does not imply any violation of the principles of conservation of energy and charge equivalence, given that there will be no out-of-balance force when such anomalous forces are considered in the context of the whole system of charge which must, perforce, include the local electromagnetic frame itself. Such discharges must be viewed as open energy systems, in balance with their electromagnetic environment: their apparatuses may constitute materially closed or limited systems, but they are physically and energetically open systems. Current work on Aspden's formulation of Ampere's Law indicates that both classical electromagnetism and special relativity ignore precisely, in circuits or in plasma, the longitudinal interactions that coexist with transverse ones. Standing longitudinal pressure waves, of a non-electromagnetic nature, have been previously shown in plasma electrons, which did not conform to the Bohm and Gross plasma oscillation mechanism (Pappas, P. T. (1983) "The original Ampere force and Bio-Savart and Lorentz forces", Il Nuovo Cimento, 76B:189; Looney, D. H. and Brown, S. C. (1954) "The excitation of plasma oscillations" Phys. Rev. 93:965)

The present theoretical approach to the novel regime of electrical discharge which we have isolated in specially designed devices, and to its mixed glow-arc characteristics, suggests that a similar, out-of balance current quadrature phenomenon occurs in the discharge plasma during the low field, autoelectronic emission-triggered PAGD, and is responsible for the observed surplus of energy in the experimental system described in this report. Clearly, all the evidence we have adduced indicates that there is a powerful longitudinal component to the emission-triggered PAGD, ie that the discharge pulses characteristic of this pre-VAD regime are longitudinally propelled jets of cathode-ejected high speed electrons and high speed ions. We have performed experiments, in the PAGD regime of operation, with very thin axial members that bend easily when placed in the path of the discharge, or with Crooke radiometer-type paddle-wheels, and both show the presence of a net longitudinal force in the plasma discharge acting in the direction of the anode, which confirms the magnitude of the atomic counterflow (ionized and neutral) present during the PAGD, very much like Tanberg's pendulum did for the VAD. These observations also tally with the explosive action of the emission mechanism, such as we have examined it above. In this context, two aspects of the PAGD are remarkable: the fact that a phenomenon akin to field emission occurs at low field values, for large area electrodes across large gaps, and the conclusion that the PAGD must deploy an excessively large counterflow of, in all probability, both ionized and neutral cathodic particles. The observation of ion current contributions to the cathode current on the order of 8 to 10%, in VADs, can hardly apply to the PAGD mechanism responsible for the anomalous currents and counterflows observed. Hence, we should further expect that the characteristically intermittent, or chopped current regime of the PAGD, is a major factor in the generation of disproportionately high energy longitudinal pulses and in allowing our system to capture most of the electrical energy output from the device. In all probability, field collapse at the end of discharge favours the nearly integral collection of the plasma charge, and ensures the transduction of most of the plasma energy of the pulse (blocked, as it is, from flowing back through the input port to the drive pack) to the output port, through the parallel, asymmetric capacitance bridge that interfaces with the charge recovery reservoir (the charge pack). Collapse of the field of the discharge may also be a contributing factor to the anomalous acceleration of ions, and to the observed anode plating effect. It is equally possible that such abnormally large longitudinal pulses may never be observable, for a given arrangement and scale, above threshold frequencies of the oscillation; we have, in this sense, presented data that indicates that for a given geometry, above specific PAGD frequencies, the capture of surplus energy decreases steadily in efficiency until it ceases altogether, for a given arrangement. The point at which this surplus begins to decrease coincides with the setting in of frequency-dependent irregularities in the discharge sequence and, most importantly, it coincides with a reduction of the peak pulse current for each PAGD pulse. We have further remarked that increasing the PAGD frequency above the zero surplus point, for a given arrangement, by manipulating any of the frequency control parameters, provokes the slippage of the PAGD into a full fledged VAD regime, while input currents greatly increase and output peak currents greatly decrease (to comparable peak input levels of 10 to 15A). The transition between the two modes of emission-triggered discharge, PAGD and VAD, thus appears to be tied in to adjustable thresholds in the frequency of the emission discontinuities; in this sense, it is rather likely that the plasma field collapse plays a major role in regularizing and optimizing the anomalous energies of field emissions, as in the PAGD regime. At low frequencies of low field emission, the emission regime is highly discontinuous, diachronic and regular, for it has time to fully extinguish the discharge; hence the PAGD singularity, in which the phases of each discharge pulse are well defined and sequential. Above a given high frequency, when ion and electron recombination will happen more often, before each can be collected at the electrodes, the stream of emitted discontinuities merges into a noisy, randomized continuum, where simultaneous emissions become possible and the plasma field no longer has time to collapse and fully resolve the longitudinal pulses. Any anomalous energy generated is then minimized and trapped in the plasma body and, in these conditions, the VAD regime eventually sets in. Such model would easily explain why the high field VAD experiments performed to date have never detected such extraordinarily large anomalous forces.

On the other hand, the quasi-coherent aspect of the discharge suggests that the vacuum gap, in functioning during the PAGD regime both as an insulator and as a conductor with capacitative and self-inductive properties, is periodically altered by large and intense polarizations which are resolved by the discrete emission of longitudinal pulses from the cathode. It is possible that these nonlinear oscillations resulting from sudden depolarization of the vacuum gap by high speed explosive emissions elicited at the convection focus of the distorted field, might be in resonance or near resonance with the external circuitry, but the most apparent effect of increasing the capacitance in all bridge members is to increase the jet current and the transduced current flowing into the charge pack. The PAGD amplitude variation also presents, after the large negative discontinuity, a growing oscillation at very high resonant frequencies, which are typical of inductive chopping currents in a VAD, before extinction occurs. Unlike the VAD inductive case, in the absence of any coils other than the wire wound resistors, the PAGD relaxation oscillations which follow each pulse only extinguish the discharge when the voltage potential of the amplitude curve rises above the applied voltage, just as the plasma potential drops the most. Given the entirely non-inductive nature of the external circuit utilized in many instances, the inductive properties in evidence are those of the vacuum device itself. It also suggests that, in the absence of any need of an applied external magnetic field for the PAGD discharge to occur coherently, it is possible that the magnitude of the currents generated produces by itself a significant self-magnetic field. Thus, we cannot rule out the possibility of a self-organization of the plasma discharge, which may, in Prigogine's sense, constitute a dissipative structure (Prigogine, I. and George, C. (1977), "New quantization rules for dissipative systems", Int. J. Quantum Chem., 12 (Suppl.1):177). Such self-ordering of the PAGD plasma jet is suggested by the experimentally observed transition of these pulses from the current saturated limit of the normal glow discharge region, into the PAGD regime, as a function of increasing current: smaller foci of discharge can be seen to discontinuously agglutinate into larger emission cones, or into jets with a vortex-like appearance, when the input current reaches a given threshold. It is possible that, under these conditions, the distribution of the charge carriers and their sudden fluctuations may render any steady state plasma boundary conditions ineffective and provoke a singularity in the discharge mechanism; this nonlinear behaviour, together with any self-magnetic effects, might provide radial coherence of the plasma flow along the longitudinal path of the discharge. This concept is akin to what has been proposed for periodically evanescent solution structures referred to as instantons, that represent self-organizing transitions between the two states of a system. The PAGD may well be an instance of an instanton type structure bridging the open, or conductive, and the closed, or insulating, states of the vacuum gap. An analytical formulation of the problem of the plasma flow from the cathode spot to the anode, which would take into account the self-magnetic and self-organizing properties of the PAGD plasma channel, would be extremely difficult, given the out of balance longitudinal force, its abnormal energy transfer and associated counterflow, as well as the competition between collisional and inertial exchanges.

The plating observed at the anode most likely results from the impact of counterflowing ions (and possibly neutral atoms), whereas the pitting of the (locally molten) cathode results from the emission of vaporized metallic material and electrons, as well as, secondarily, from bombardment by incident positive ions. The first action smooths the surface by mirroring it (deposition of cathode-derived atoms) and abrading it, whereas the latter smooths it in places by rounding concavities and by forming molten droplets upon local cooling, while simultaneously roughening it on the crater peripheries. One might think that this cathode roughening should lower the work function and facilitate the discharge, but the facts indicate that just the opposite must be happening in view of changes in the PAGD according to the nature and state of the cathode surface. The observed alterations of electrode work function for PAGD low field emission must thus be related to the molecular and charge effects of these different actions at the two electrodes. It appears that for large parallel plate electrodes, the PAGD low field emission is modulated by the nature and, most likely, by the molecular structure of the metallic surface layer of the emitter.

We have thus devised a system for the capture as electricity of the energy of anomalously energetic longitudinal pulses sequentially triggered by spontaneous emissions of high speed electrons and ions generated from low work function cathodes, during the low field and singularly mixed PAGD regime of electrical discharge in vacuo. To confirm the above interpretation of the anomalous flux in the observed PAGD phenomenon, the cathode jet composition, as well as time- and usage-dependent changes occurring in the tubes, with diverse sealed negative pressures and after submission to prolonged PAGD operation, must be analyzed mass spectroscopically. In any event, the excess energy present in the anomalous counterflowing force appears to stem from a discharge mechanism that effectively pulls high speed electrons and constituent atoms out of a metal surface, at low fields and with high current densities, and is modulated by a complex multiplicity of parameters. The system described appears to transduce efficiently the observed nonlinear longitudinal pulse discontinuities of the plasma field, under conditions of current saturation of the cathode, because the self-extinguishing and self-limiting properties of the discharge allows the energy from the collapse of the discharge to be captured. The particular design of the circuitry, which couples a rectification bridge to the asymmetric bridge quadrature of large capacitances, placed at the output of the PAGD generator, permits effective capture. Our findings constitute striking evidence for Aspden's contention of a need to revise our present electrodynamic concepts. The dual ported PAGD discharge tube circuits which we have described are the first electrical systems we know of which permit effective exploitation of anomalous cathode reaction forces and allow for the recovery of electrical energy from systems exhibiting this effect. Any apparent imbalance in the electrical energy input to the system and withdrawn from the system by its operator must be considered in the context of the entire continuum in which the system operates, within which it is anticipated that accepted principles of energy balance will be maintained.

Moreover, the energy conversion system of the invention has substantial utility as an electrical inverter accepting direct current, and providing one or more of a direct current output at lower voltage and higher current, variable frequency input to alternating current motors, and, by suitable combinations of discharge tube systems, more flexible DC to DC conversion systems.

As an alternative to the batteries used in the experiments described, a DC power supply may be utilized or, more advantageously from the viewpoint of entailing less transformation losses, a DC generator to provide the electrical energy input to the system. As a DC motor can be run directly from the rectified output of the circuit of FIG. 9 at E1–E2, in place of a battery charge pack, DC motor/generator sets of suitable characteristics (in terms of back E.M.F. and circuit loading) can be used to charge the batteries of the drive pack, utilizing the rectified PAGD output to drive the DC motor component of the set. This provides a simple, one battery pack solution, where the PAGD input and output circuits are electrically separated by the DC motor/generator interface: the drive pack is simultaneously being discharged to drive PAGD production, and charged by the DC generator output which, in turn, is being driven by the electromechanical transformation of the rectified PAGD output that would typically accrue to a charge pack in the experiments already described. The main limitations to such an arrangement lie in the efficiency of the motor and generator transformations utilized.

A pulsed DC source could be used to provide input to the circuit if suitably synchronized, but care is needed not to interfere unduly with the autoelectronic mechanism of the field induced cathode emissions.

TABLE 1

Results for the ballast resistance (and current) dependent PAGD frequency utilizing an H34 aluminum pulse generator with 128 cm$^2$ plates at 5.5 cm distance, in the triode configuration, at a pressure of 0.8 Torr. The circuit employed is that of the present invention, as described in the third Results Section. DCV = 560.

| R in Ω | Regime of Discharge | Pulse Rate >100 V |
|---|---|---|
| 5,000 | NGD (Cold Cathode) | 0 |
| 600 | PAGD | 10 PPS |
| 300 | PAGD | 40 PPS |
| 150 | PAGD | 180 PPS |
| 100 | VAD | 0 |
| 50 | VAD | 0 |

TABLE 2

128 cm$^2$ H220 Al; 570 volts DC; 300 Ω = R1; Diode Configuration

| | PPS | p(Torr) | Cumulative Pulse Count |
|---|---|---|---|
| 1) | 200 | 0.08 | ~2.4 × 10$^5$ |
| 2) | 200 | 0.5 | ~1.5 × 10$^6$ |
| 3) | 200 | 0.8–1 | ~2.5 × 10$^6$ |
| 4) | 25 | 0.5 | 3 × 10$^6$ pulses |
| 5) | 200 | 0.5 | 1.5 × 10$^6$ (after first electrode reversal) |

TABLE 3

RESIDUAL GAS EFFECT

| pressure in Torr | PPS in AIR | PPS in ARGON |
|---|---|---|
| 0.45 | ND | 10 |
| 0.5 | 1.8 ± 0.3 | ND |
| 0.55 | 4.8 ± 0.9 | 16.7 ± 1.8 |
| 1.0 | 11.4 ± 0.8 | 448 ± 27.4 |
| 1.25 | 214.5 ± 14.3 | ND |
| 2.0 | 36.2 ± 2.6 | 206 ± 19.6 |
| | | 158.7 ± 24 |
| 2.5 | 1.36 ± 0.3 | 0 |

TABLE 4

| Charge pack No. of cells | PPS | PAGD |
|---|---|---|
| 36 | 0 | — |
| 31 | 1 | + |
| 29 | 10 | + |
| 19 | 1 | + |
| 9 | 0 | — |

TABLE 5

| 1 Expt. No. | 2 Battery Pack | 3 Position | 4 Open Voltage | 5 V/cell | 6 % total rel. cpty. | 7 Max. hr. left | 8 % rel. cpty gained | 8 % rel. cpty lost | 9 Total kWh | 10 ΔkWh gain | 10 ΔkWh loss | 11 PAGD per sec |
|---|---|---|---|---|---|---|---|---|---|---|---|---|
| 1 | Charge | start | 348 | 12.0 | 40 | 8 | | | 0.835 | | | 8 |
| | Charge | end | 366 | 12.62 | 83 | 16.6 | 43 | | 1.823 | 0.988 | | |
| | Driver | start | 576 | 12.52 | 77 | 15.4 | | | 2.660 | | | |
| | Driver | end | 572 | 12.43 | 70 | 14 | | 7 | 2.402 | | 0.258 | |
| 2 | C | b | 331 | 11.41 | 2 | 0.4 | | | 0.040 | | | 61 |
| | C | a | 351 | 12.1 | 47.5 | 9.5 | 45.5 | | 1.002 | 0.962 | | |
| | D | b | 553 | 12.02 | 40 | 8 | | | 1.327 | | | |
| | D | a | 546 | 11.9 | 33 | 6.6 | | 7 | 1.081 | | 0.246 | |
| 3 | C | b | 345 | 11.9 | 32.5 | 6.5 | | | 0.673 | | | 3 |
| | C | a | 361 | 12.45 | 72.5 | 14.4 | 40 | | 1.559 | 0.886 | | |
| | D | b | 559 | 12.15 | 51 | 10.2 | | | 1.710 | | | |
| | D | a | 552 | 12.0 | 40 | 8 | | 11 | 1.324 | | 0.386 | |
| 4 | C | b | 360 | 12.41 | 70 | 14 | | | 1.512 | | | 32 |
| | C | a | 373 | 12.86 | 103 | >20 | 33 | | 2.238 | 0.726 | | |
| | D | b | 562 | 12.22 | 54.5 | 10.9 | | | 1.838 | | | |
| | D | a | 557 | 12.11 | 48 | 9.6 | | 6.5 | 1.604 | | 0.234 | |
| 5 | C | b | 340 | 11.7 | 20 | 4 | | | 0.408 | | | 2 |
| | C | a | 365 | 12.59 | 83 | 16.6 | 63 | | 1.818 | 1.440 | | |
| | D | b | 527 | 11.45 | 3.2 | 0.6 | | | 0.101 | | | |
| | D | a | 517 | 11.24 | 1.8 | 0.4 | | 0.2 | 0.056 | | 0.045 | |
| 6 | C | b | 340 | 11.72 | 21.5 | 4.3 | | | 0.438 | | | 8 |
| | C | a | 367 | 12.66 | 87.5 | 17.5 | 66 | | 1.927 | 1.489 | | |
| | D | b | 589 | 12.8 | 100 | 20 | | | 3.530 | | | |
| | D | a | 564 | 12.26 | 58.5 | 11.7 | | 41.5 | 1.979 | | 1.551 | |
| 7 | C | b | 318 | 10.97 | 1.2 | 0.24 | | | 0.023 | | | 5 |
| | C | a | 359 | 12.38 | 67.5 | 13.5 | 66.3 | | 1.454 | 1.431 | | |
| | D | b | 575 | 12.5 | 77 | 15.4 | | | 2.656 | | | |
| | D | a | 567 | 12.32 | 63.5 | 12.7 | | 13.5 | 2.160 | | 0.496 | |
| 8 | C | b | 328 | 11.71 | 20 | 4 | | | 0.393 | | | 32 |
| | C | a | 350 | 12.5 | 76.5 | 15.3 | 56.5 | | 1.606 | 1.213 | | |
| | D | b | 582 | 12.65 | 87.5 | 17.5 | | | 3.055 | | | |
| | D | a | 579.5 | 12.60 | 84 | 16.8 | | 3.5 | 2.921 | | 0.134 | |

| 1 Expt. No. | 2 Battery Pack | 3 Position | 12 Exptl. time | 13 rel. kWh/h gain | 13 rel. kWh/h loss | 14 net kWh/h production | 15 Breakeven efficiency | 16 Cell #/ pack | 17 tube | 18 Cathode Area | 19 Plate |
|---|---|---|---|---|---|---|---|---|---|---|---|
| 1 | Charge | start | 21.5' | | | 2.071 | 388% | 29 | A26 | 128 cm$^2$ | H34 |
| | Charge | end | | | 2.791 | | | | | | |

TABLE 5-continued

| Expt. No. | Battery Pack | Position | 18 | 19 | | | | | | |
|---|---|---|---|---|---|---|---|---|---|---|
| | Driver | start | | | | | 46 | | | |
| | Driver | end | | 0.720 | | | | | | |
| 2 | C | b | 18' | | 2.387 | 391% | 29 | A26 | 128 cm² | H34 |
| | C | a | | 3.207 | | | | | | |
| | D | b | | | | | 46 | | | |
| | D | a | | 0.820 | | | | | | |
| 3 | C | b | 21.5' | | 1.396 | 230% | 29 | A26 | 128 cm² | H34 |
| | C | a | | 2.473 | | | | | | |
| | D | b | | | | | 46 | | | |
| | D | a | | 1.077 | | | | | | |
| 4 | C | b | 63.5' | | 0.465 | 310% | 29 | A28 | 128 cm² | H220 |
| | C | a | | 0.686 | | | | | | |
| | D | b | | | | | 46 | | | |
| | D | a | | 0.221 | | | | | | |
| 5 | C | b | 80' | | 1.064 | 6,750% | 29 | A26 | 128 cm² | H34 |
| | C | a | | 1.080 | | | | | | |
| | D | b | | | | | 46 | | | |
| | D | a | | 0.016 | | | | | | |
| 6 | C | b | 21.5' | | −0.173 | 96% | 29 | A26 | 128 cm² | H34 |
| | C | a | | 4.155 | | | | | | |
| | D | b | | | | | 46 | | | |
| | D | a | | 4.328 | | | | | | |
| 7 | C | b | 64.5' | | 0.870 | 289% | 29 | A45 | 64 cm² | H34 |
| | C | a | | 1.331 | | | | | | |
| | D | b | | | | | 46 | | | |
| | D | a | | 0.461 | | | | | | |
| 8 | C | b | 28.5' | | 2.272 | 906% | 28 | A45 | 64 cm² | H34 |
| | C | a | | 2.554 | | | | | | |
| | D | b | | | | | 46 | | | |
| | D | a | | 0.282 | | | | | | |

| 1 Expt. No. | 2 Battery Pack | 3 Position | 20 R1 ohm | 21 C3/C5 mfd | 22 C7a/C7b mfd | 23 Motor arm | 24 Pressure | 25 Gap cm | 26 OV rlx. time | 27 C4 mfd | 28 R4 ohms | 29 Motor rpm |
|---|---|---|---|---|---|---|---|---|---|---|---|---|
| 1 | Charge | start | 300 | 20,700 | 3,300 | off | 0.8 Torr | 5.5 | 30' | NA | NA | NA |
| | Charge | end | | | | | | | | | | |
| | Driver | start | | | | | | | | | | |
| | Driver | end | | | | | | | | | | |
| 2 | C | b | 300 | 20,700 | 3,300 | off | 0.8 Torr | 5.5 | 30' | NA | NA | NA |
| | C | a | | | | | | | | | | |
| | D | b | | | | | | | | | | |
| | D | a | | | | | | | | | | |
| 3 | C | b | 300 | 20,700 | 3,300 | off | 0.7 Torr | 5.5 | 15' | NA | NA | NA |
| | C | a | | | | | | | | | | |
| | D | b | | | | | | | | | | |
| | D | a | | | | | | | | | | |
| 4 | C | b | 300 | 34,700 | 5,500 | off | 0.2 Torr | 5.5 | 30' | NA | NA | NA |
| | C | a | | | | | | | | | | |
| | D | b | | | | | | | | | | |
| | D | a | | | | | | | | | | |
| 5 | C | b | 150 | 34,700 | 3,300 | on | 0.8 Torr | 5.5 | 15' | 8 | 500 | 1,200 |
| | C | a | | | | | | | | | | |
| | D | b | | | | | | | | | | |
| | D | a | | | | | | | | | | |
| 6 | C | b | 300 | 20,700 | 3,300 | on | 0.8 Torr | 5.5 | 15' | 16 | 0 | 2,000 |
| | C | a | | | | | | | | | | |
| | D | b | | | | | | | | | | |
| | D | a | | | | | | | | | | |
| 7 | C | b | 600 | 34,700 | 3,300 | off | 0.8 Torr | 4 | 30' | NA | NA | NA |
| | C | a | | | | | | | | | | |
| | D | b | | | | | | | | | | |
| | D | a | | | | | | | | | | |
| 8 | C | b | 600 | 34,700 | 5,500 | off | 0.8 Torr | 4 | 30' | NA | NA | NA |
| | C | a | | | | | | | | | | |
| | D | b | | | | | | | | | | |
| | D | a | | | | | | | | | | |

TABLE 6

| Expt. No. | Battery Pack | Position | Load Voltage | Watts/cell | Hr. left | Total kWh | ΔkWh gain | ΔkWh loss | rel. kWh/h gain | rel. kWh/h loss | net kWh/h | B. Eff. |
|---|---|---|---|---|---|---|---|---|---|---|---|---|
| 1 | C | s | 335.7 | 4.445 | 4 | 0.516 | | | | | 3.014 | 776% |
| | C | e | 357.5 | 5.05 | 12 | 1.757 | 1.241 | | 3.46 | | | |
| | D | s | 568.0 | 3.20 | 13 | 1.766 | | | | | | |
| | D | e | 564.6 | 3.175 | 11 | 1.606 | | 0.16 | | 0.446 | | |
| 2 | C | s | 315.5 | 3.93 | 1 | 0.114 | | | | | 1.012 | 504% |
| | C | e | 327.8 | 4.25 | 4.5 | 0.502 | 0.387 | | 1.225 | | | |
| | D | s | 540.7 | 2.91 | 4 | 0.535 | | | | | | |
| | D | e | 535.3 | 2.87 | 3.5 | 0.462 | | 0.073 | | 0.243 | | |
| 3 | C | s | 328 | 4.23 | 2 | 0.245 | | | | | 1.175 | 703% |
| | C | e | 351.7 | 4.91 | 7 | 0.737 | 0.492 | | 1.370 | | | |

TABLE 6-continued

| Expt. No. | Battery Pack | Position | Load Voltage | Watts/ cell | Hr. left | Total kWh | ΔkWh gain | ΔkWh loss | rel. kWh/h gain | rel. kWh/h loss | net kWh/h | B. Eff. |
|---|---|---|---|---|---|---|---|---|---|---|---|---|
| | D | s | 546 | 2.95 | 5 | 0.680 | | | | | | |
| | D | s | 545.5 | 2.90 | 4.5 | 0.610 | | 0.070 | | 0.195 | | |

TABLE 7

| 1 Expt. No. | 2 Config. | 3 Pressure Torr | 4 Tube | 5 DP DCV | 6 Plates DCV | 7 DP DCA | 8 DP Watts | 9 PAGD Volts | 10 PAGD V/cm | 11 CP DCV |
|---|---|---|---|---|---|---|---|---|---|---|
| 1 | dd | 0.8 | A29 | 562 | 350 | 0.65 | 137.8 | 212 | 77.1 | 375 |
| 2 | dd | 0.09 | A29 | 562 | 402 | 0.60- | 96 | 160 | 58.2 | 378 |
| 3 | dd | 0.8 | A29 | 560 | 371 | 0.59 | 111.5 | 189 | 68.7 | 374 |
| 4 | dd | 0.09 | A29 | 563 | 409 | 0.49 | 75.9 | 154 | 56 | 379 |
| 5 | t | 1.5 | A28 | 561 | 439 | 0.41 | 49.9 | 122 | 22.2 | 377 |
| 6 | t | 1.5 | A28 | 560 | 425 | 0.51 | 68.9 | 135 | 24.5 | 375 |
| 7 | t | 1.0 | A28 | 556 | 398 | 0.48 | 75 | 158 | 28.7 | 376.5 |
| 8 | t | 0.5 | A28 | 559.5 | 398 | 0.68 | 109.8 | 161.5 | 29.4 | 377.5 |
| 9 | t | 0.5 | A28 | 563 | 390 | 0.75 | 112.45 | 173 | 31.5 | 373 |
| 10 | sd | 0.5 | A28 | 565 | 422 | 0.47 | 67.2 | 143 | 26 | 376 |
| 11 | sd | 0.5 | A28 | 561.5 | 415 | 0.50 | 73 | 146.5 | 26.6 | 380 |
| 12 | sd | 0.5 | A28 | 562 | 413.5 | 0.55 | 81.7 | 148.5 | 27 | 380 |
| 13 | dd | 0.25 | A28 | 553 | 438 | 0.35 | 40 | 115 | 41.8 | 381.5 |
| 14 | dd | 0.25 | A28 | 549 | 325 | 0.70 | 156.8 | 224 | 81.5 | 263 |

| 1 Expt. No. | 2 Config. | 12 CP DCA | 13 CP Watts | 14 Total Resistance | 15 Breakeven Efficiency | 16 PPS | 17 Bridge diode | 18 Input diode | 19 Motor status | 20 FIG. 3 |
|---|---|---|---|---|---|---|---|---|---|---|
| 1 | dd | 1.25 | 468.8 | 326 | 340% | 450 | M860 | HFR | off | + |
| 2 | dd | 0.70 | 264.6 | % 270 | 276% | 92 | M860 | HFR | off | |
| 3 | dd | 0.65 | 243.1 | 243 | 218% | 500 | HFR | HFR | off | |
| 4 | dd | 0.76 | 288 | 314 | 379% | 77 | HFR | HFR | off | |
| 5 | t | 0.58 | 219 | 298 | 439% | 52 | HFR | HFR | off | |
| 6 | t | 0.69 | 259 | 265 | 376% | 100 | M860 | HFR | off | |
| 7 | t | 0.57 | 213.1 | 329 | 284% | 355 | M860 | HFR | off | |
| 8 | t | 0.67 | 252.9 | 238 | 230% | 92 | HFR | HFR | off | |
| 9 | t | 0.65 | 280 | 266 | 249% | 118 | M860 | HFR | off | + |
| 10 | sd | 1.03 | 387.3 | 286 | 530% | 25 | M860 | HFR | off | |
| 11 | sd | 0.73 | 277.4 | 293 | 379% | 11 | HFR | HFR | off | + |
| 12 | sd | 0.71 | 269.8 | 270 | 330% | 10 | HFR | HFR | on | + |
| 13 | dd | 0.59 | 225.1 | 329 | 563% | 10 | HFR | HFR | off | |
| 14 | dd | 1.36 | 257.7 | 320 | 228% | 1 | HFR | HFR | off | -- |

TABLE 8

| 1 Expt. No. | 2 Battery Pack | 3 Position | 4 Total Wh | 5 Rel. Cap. | 6 Torr | 7 Limit in W | 8 ΔkWh gain | 8 ΔkWh loss | 9 Exptl. time | 10 abs. kWh/h gain | 10 abs. kWh/h loss | 10 net | 11 BE |
|---|---|---|---|---|---|---|---|---|---|---|---|---|---|
| 1 | C | b | 159 | 12% | 0.8 | 90 | | | 21.5' | | | +664 | 846% |
| | C | a | 428 | 32% | | | 269 | | | 753 | | | |
| | D | b | 1764 | 85% | | 115 | | | | | | | |
| | D | a | 1732 | 84% | | | | 32 | | | 89 | | |
| 2 | C | b | -118 | 9% | 0.8 | 90 | | | 18' | | | +616 | 2,667% |
| | C | a | 303.5 | 23% | | | 192 | | | 640 | | | |
| | D | b | 542.3 | 26% | | 115 | | | | | | | |
| | D | a | 535 | 25.9% | | | | 7.3 | | | 24 | | |
| 3 | C | b | 950.4 | 72% | 0.2 | 90 | | | 70' | | | +186 | 3485% |
| | C | a | 1,161 | 88% | | | 210.9 | | | 191.7 | | | |
| | D | b | 660 | 32% | | 115 | | | | | | | |
| | D | a | 654 | 32% | | | | 6.5 | | | 5.6 | | |
| 4 | C | b | 15.8 | 1.2% | 0.8 | 90 | | | 64.5' | | | +53.7 | 406% |
| | C | a | 81.9 | 6% | | | 65 | | | 60 | | | |
| | D | b | 181 | 8.7% | | 115 | | | | | | | |
| | D | a | 165 | 8% | | | | 16 | | | 14.7 | | |
| 5 | C | b | 34.5 | 2.6% | 0.8 | 90 | | | 28.5' | | | +169.1 | 436% |
| | C | a | 138.8 | 10.5% | | | 104.3 | | | 219.6 | | | |
| | D | b | 1,114 | 54% | | 115 | | | | | | | |
| | D | a | 1,089 | 53% | | | | 24 | | | 50.5 | | |
| 6 | C | b | 55.4 | 4.2% | 0.8 | 90 | | | 74' | | | +117 | 483% |
| | C | a | 237.6 | 18% | | | 182.2 | | | 148 | | | |
| | D | b | 669.3 | 32% | | 115 | | | | | | | |
| | D | a | 631.7 | 30.6% | | | | 37.7 | | | 30.6 | | |

| 1 Expt. No. | 2 Battery Pack | 3 Position | 12 Config. | 13 Tube | 14 Cathode area | 15 gap cm | 16 PPS | 17 PAGD seq. method | 18 R1 ohms | 19 Plate material | 20 | 21 C3/C5 mfd | 22 C7a/C7b mfd |
|---|---|---|---|---|---|---|---|---|---|---|---|---|---|
| 1 | C | b | Triode | A26 | 128 cm2 | 5.5 | 8 | Continuous | 300 | H34 | | 20,700 | 3.300 |
| | C | a | | | | | | | | | | | |

TABLE 8-continued

| | | | | | | | | | | | |
|---|---|---|---|---|---|---|---|---|---|---|---|
| | D | b | | | | | | | | | |
| | D | a | | | | | | | | | |
| 2 | C | b | Triode | A26 | 128 cm2 | 5.5 | 61 | Interrupted | 300 | H34 | 20,700 | 3,300 |
| | C | a | | | | | | | | | |
| | D | b | | | | | | | | | |
| | D | a | | | | | | | | | |
| 3 | C | b | Triode | A28 | 128 cm2 | 5.5 | 32 | Interrupted | 300 | H220 | 34,700 | 5,500 |
| | C | a | | | | | | | | | |
| | D | b | | | | | | | | | |
| | D | a | | | | | | | | | |
| 4 | C | b | Triode | A46 | 64 cm2 | 4.0 | 5 | Continuous | 600 | H34 | 34,700 | 5,500 |
| | C | a | | | | | | | | | |
| | D | b | | | | | | | | | |
| | D | a | | | | | | | | | |
| 5 | C | b | Triode | A46 | 64 cm2 | 4.0 | 32 | Interrupted | 600 | H34 | 34,700 | 5,500 |
| | C | a | | | | | | | | | |
| | D | b | | | | | | | | | |
| | D | a | | | | | | | | | |
| 6 | C | b | Plate Diode | A29 | 128 cm2 | 5.5 | 8 | Interrupted | 300 | H220 | 34,700 | 5,500 |
| | C | a | | | | | | | | | |
| | D | b | | | | | | | | | |
| | D | a | | | | | | | | | |

TABLE 9

Utilizing: Al H200, 128 cm² plates
DP = 46 cells
CP = 23 cells

| | PPS | CP Gain per pulse in mWh | Net Gain per pulse mWh | CP Gain per second mWh | Net Gain per second mWh | Pressure in Torr |
|---|---|---|---|---|---|---|
| #1 | 1.5 | 22.3 | 11.7 | 33.45 | 17.55 | 0.2 |
| #2 | 8 | 5.6 | 4.4 | 44.8 | 35.2 | 0.8 |
| #3 | 110 | 0.78 | 0.27 | 85.8 | 29.7 | 2.0 |

We claim:

1. Apparatus comprising a discharge tube and an electrical circuit containing said discharge tube and configured to operate the latter to provide endogenous pulsatory cold cathode autoelectronic emissions, the circuit being double ported with an input port connected to a source of direct current at a potential sufficient to initiate said emissions, and an output port connected to a current sink effective to absorb at least a substantial portion of electrical energy released by collapse of said emissions.

2. Apparatus according to claim 1 configured so that the emissions occur in a pulsed abnormal glow discharge regime.

3. Apparatus according to claim 2, wherein the input port includes components ensuring that the flow of current therein is unidirectional, and incorporating impedance sufficient to limit the flow of current therein.

4. Apparatus according to claim 2, including capacitors connected to the discharge tube, the input port and the output port, which provide charge storage in the input port and direct current isolation between the input and output ports.

5. Apparatus according to claim 4, wherein the output port comprises a rectifier having an input connected to said capacitors, reservoir capacitance connected to the output of said rectifier, and reverse current blocking devices connected between said reservoir capacitance and the current sink.

6. Apparatus according to claim 5, wherein the rectifier is a bridge rectifier, and the reservoir capacitance is provided by a capacitor bridge having ends connected to outputs of the bridge rectifier, and an intermediate point connected to one input of the bridge rectifier.

7. Apparatus according to claim 4, further including an alternating current motor and a capacitor in series, connected between the connections of said capacitors to the output port.

8. Apparatus according to claim 2, wherein the current sink comprises a secondary battery.

9. Apparatus according to claim 2, wherein the current sink comprises an electric motor.

10. Apparatus according to claim 2, wherein the direct current source comprises a secondary battery.

11. Apparatus according to claim 2, wherein the direct current source is a DC generator.

12. Apparatus according to claim 9, wherein the motor is a DC motor.

13. Apparatus according to claim 10, including a circuit for charging from the output port a battery to be used as the direct current source.

14. Apparatus according to claim 2, wherein the direct current source is a rectified AC source.

15. Apparatus according to claim 2, wherein the discharge tube is connected as a single diode.

16. Apparatus according to claim 2, wherein the discharge tube is connected as a multiple diode with plates connected as cathodes and an intermediate electrode connected as an anode.

17. Apparatus according to claim 2, wherein the discharge tube is connected as a triode, with an intermediate electrode functioning as an auxiliary cathode.

18. Apparatus according to claim 2, wherein a first potential is applied to the input port by the source of direct current to induce emission, a back EMF is applied to the output port by the current sink, and an extinction potential of the emissions is greater than the back EMF.

19. A method of energy conversion, comprising initiating plasma eruptions from the cathode of a discharge tube operating in a pulsed abnormal glow discharge regime utilizing electrical energy from a source in a first circuit connected to said discharge tube, and capturing electrical energy generated by the collapse of such eruptions in a second circuit connected to said discharge tube.

20. A method according to claim 19, wherein current flowing into the discharge tube during said eruptions is at least 50 ma.

21. A method according to claim 19, wherein current flowing into the discharge tube during said eruptions is at least 500 ma.

22. A method according to claim 19, in which charge carriers within plasma outputs are accelerated through at least one of an electric and magnetic field.

23. A method of energy conversion, comprising inducing endogenous pulsatory low-field, large-area cold-cathode autoelectronic emissions from the cathode of a discharge tube capable of sustaining such emissions, utilizing electrical energy from a source in a first circuit connected to said discharge tube, and capturing electrical energy generated by the collapse of such emissions in a second circuit connected to said discharge tube.

* * * * *